United States Patent
Jung et al.

(10) Patent No.: US 8,233,042 B2
(45) Date of Patent: Jul. 31, 2012

(54) PRESERVATION AND/OR DEGRADATION OF A VIDEO/AUDIO DATA STREAM

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1478 days.

(21) Appl. No.: 11/441,785

(22) Filed: May 26, 2006

(65) Prior Publication Data

US 2007/0100860 A1   May 3, 2007

Related U.S. Application Data

(63) Continuation-in-part of application No. 11/263,587, filed on Oct. 31, 2005, now Pat. No. 7,872,675, and a continuation-in-part of application No. 11/264,701, filed on Nov. 1, 2005, and a continuation-in-part of application No. 11/364,496, filed on Feb. 28, 2006, and a continuation-in-part of application No. 11/376,627, filed on Mar. 15, 2006, now abandoned, and a continuation-in-part of application No. 11/396,279, filed on Mar. 31, 2006, now abandoned, and a continuation-in-part of application No. 11/413,271, filed on Apr. 28, 2006, now abandoned, and a continuation-in-part of application No. 11/434,568, filed on May 15, 2006.

(51) Int. Cl.
 *H04N 5/76* (2006.01)
(52) U.S. Cl. .................................. 348/143; 386/295
(58) Field of Classification Search .................. 386/46, 386/295; 348/143–159
 See application file for complete search history.

(56) References Cited

U.S. PATENT DOCUMENTS

| 4,249,218 A | 2/1981 | Davis et al. |
| 5,164,831 A | 11/1992 | Kuchta et al. |
| 5,388,197 A | 2/1995 | Rayner |
| 5,467,288 A | 11/1995 | Fasciano et al. |
| 5,485,553 A | 1/1996 | Kovalick et al. |
| 5,485,554 A | 1/1996 | Lowitz et al. |

(Continued)

FOREIGN PATENT DOCUMENTS

JP   H09-018762   1/1997

(Continued)

OTHER PUBLICATIONS

PCT International Search Report; International App. No. PCT/US06/42840; pp. 1-2; Sep. 26, 2007.

(Continued)

*Primary Examiner* — David Harvey

(57) ABSTRACT

In one aspect, a method related to data management includes but is not limited to accepting input for a designation of a reference designator and a beginning demarcation designator and/or an ending demarcation designator in a video/audio data stream, wherein the beginning demarcation designator and/or the ending demarcation designator are defined relative to the reference designator; and accepting input for a retention at a first resolution of a first portion of the video/audio data stream, the first portion beginning substantially at the beginning demarcation designator and ending substantially at the ending demarcation designator. In addition, other method, system, and program product aspects are described in the claims, drawings, and/or text forming a part of the present application.

40 Claims, 17 Drawing Sheets

U.S. PATENT DOCUMENTS

| | | | | |
|---|---|---|---|---|
| 5,546,145 | A | 8/1996 | Bernardi et al. | |
| 5,629,778 | A | 5/1997 | Reuman | |
| 5,659,662 | A | 8/1997 | Wilcox et al. | |
| 5,675,789 | A | 10/1997 | Ishii et al. | |
| 5,689,442 | A | 11/1997 | Swanson et al. | |
| 5,701,163 | A | 12/1997 | Richards et al. | |
| 5,738,522 | A | 4/1998 | Susholz et al. | |
| 5,764,800 | A | 6/1998 | Yamagata | |
| 5,818,977 | A | 10/1998 | Tansley | |
| 5,825,506 | A | 10/1998 | Bednar et al. | |
| 5,892,509 | A | 4/1999 | Jakobs et al. | |
| 5,917,958 | A | 6/1999 | Nunally et al. | |
| 5,926,605 | A | 7/1999 | Ichimura | |
| 5,956,081 | A | 9/1999 | Katz et al. | |
| 5,995,095 | A | 11/1999 | Ratakonda | |
| 6,011,901 | A * | 1/2000 | Kirsten | 386/226 |
| 6,107,918 | A * | 8/2000 | Klein et al. | 340/511 |
| 6,122,003 | A | 9/2000 | Anderson | |
| 6,122,411 | A | 9/2000 | Shen et al. | |
| 6,134,345 | A | 10/2000 | Berman et al. | |
| 6,157,935 | A | 12/2000 | Tran et al. | |
| 6,167,350 | A | 12/2000 | Hiramatsu et al. | |
| 6,177,958 | B1 | 1/2001 | Anderson | |
| 6,198,526 | B1 | 3/2001 | Ohtsuka | |
| 6,229,850 | B1 | 5/2001 | Linzer et al. | |
| 6,275,260 | B1 | 8/2001 | Anderson | |
| 6,384,862 | B1 | 5/2002 | Brusewitz et al. | |
| 6,445,822 | B1 | 9/2002 | Crill et al. | |
| 6,446,095 | B1 | 9/2002 | Mukai | |
| 6,476,858 | B1 | 11/2002 | Ramirez Diaz et al. | |
| 6,493,028 | B1 | 12/2002 | Anderson et al. | |
| 6,499,016 | B1 | 12/2002 | Anderson | |
| 6,512,541 | B2 | 1/2003 | Dunton et al. | |
| 6,516,154 | B1 | 2/2003 | Parulski et al. | |
| 6,519,612 | B1 | 2/2003 | Howard et al. | |
| 6,522,418 | B2 | 2/2003 | Yokomizo et al. | |
| 6,539,169 | B1 | 3/2003 | Tsubaki et al. | |
| 6,542,183 | B1 | 4/2003 | DeAngelis et al. | |
| 6,546,189 | B1 | 4/2003 | Koda | |
| 6,567,122 | B1 | 5/2003 | Anderson et al. | |
| 6,573,927 | B2 | 6/2003 | Parulski et al. | |
| 6,577,336 | B2 | 6/2003 | Safai | |
| 6,633,309 | B2 | 10/2003 | Lau et al. | |
| 6,646,676 | B1 * | 11/2003 | DaGraca et al. | 348/155 |
| 6,657,667 | B1 | 12/2003 | Anderson | |
| 6,678,413 | B1 | 1/2004 | Liang et al. | |
| 6,698,021 | B1 | 2/2004 | Amini et al. | |
| 6,701,845 | B2 | 3/2004 | Ohmura | |
| 6,710,809 | B1 | 3/2004 | Niikawa | |
| 6,714,192 | B1 | 3/2004 | Torres | |
| 6,735,253 | B1 | 5/2004 | Chang et al. | |
| 6,738,155 | B1 | 5/2004 | Rosenlund et al. | |
| 6,757,008 | B1 | 6/2004 | Smith | |
| 6,762,791 | B1 | 7/2004 | Schuetzle | |
| 6,816,071 | B2 | 11/2004 | Conti | |
| 6,823,092 | B1 | 11/2004 | Sato | |
| 6,885,395 | B1 | 4/2005 | Rabbani et al. | |
| 6,898,173 | B2 | 5/2005 | McPherson et al. | |
| 6,947,075 | B1 | 9/2005 | Niikawa | |
| 6,987,528 | B1 * | 1/2006 | Nagahisa et al. | 348/143 |
| 6,999,626 | B2 | 2/2006 | Andrew | |
| 7,015,954 | B1 | 3/2006 | Foote et al. | |
| 7,046,292 | B2 | 5/2006 | Ziemkowski | |
| 7,068,316 | B1 | 6/2006 | Pine | |
| 7,075,567 | B2 | 7/2006 | Hunter et al. | |
| 7,079,176 | B1 | 7/2006 | Freeman et al. | |
| 7,110,027 | B2 | 9/2006 | Wyman | |
| 7,227,569 | B2 | 6/2007 | Maruya | |
| 7,236,690 | B2 * | 6/2007 | Matsukawa | 386/117 |
| 7,257,317 | B2 | 8/2007 | Ohnishi | |
| 7,333,134 | B2 | 2/2008 | Miyamoto | |
| 7,340,766 | B2 | 3/2008 | Nagao et al. | |
| 7,362,968 | B2 | 4/2008 | Kim | |
| 7,366,979 | B2 | 4/2008 | Spielberg et al. | |
| 7,383,508 | B2 | 6/2008 | Toyama et al. | |
| 7,444,593 | B1 | 10/2008 | Reid | |
| 7,448,063 | B2 | 11/2008 | Freeman et al. | |
| 7,504,942 | B2 * | 3/2009 | Marman | 340/541 |
| 7,535,491 | B1 | 5/2009 | Kumagai et al. | |
| 7,576,770 | B2 | 8/2009 | Metzger et al. | |
| 7,587,674 | B2 | 9/2009 | Broeksteeg | |
| 7,733,371 | B1 * | 6/2010 | Monroe | 348/153 |
| 7,751,628 | B1 * | 7/2010 | Reisman | 382/232 |
| 7,904,814 | B2 | 3/2011 | Errico et al. | |
| 2001/0028398 | A1 | 10/2001 | Takahashi | |
| 2001/0029521 | A1 | 10/2001 | Matsuda et al. | |
| 2001/0033333 | A1 | 10/2001 | Suzuki et al. | |
| 2001/0042043 | A1 | 11/2001 | Shear et al. | |
| 2001/0046199 | A1 | 11/2001 | McPherson et al. | |
| 2001/0050875 | A1 | 12/2001 | Kahn et al. | |
| 2002/0028026 | A1 | 3/2002 | Chen et al. | |
| 2002/0030749 | A1 | 3/2002 | Nakamura et al. | |
| 2002/0054232 | A1 | 5/2002 | Inagaki | |
| 2002/0090217 | A1 | 7/2002 | Limor et al. | |
| 2002/0145622 | A1 | 10/2002 | Kauffman et al. | |
| 2002/0171737 | A1 | 11/2002 | Tullis | |
| 2002/0176016 | A1 | 11/2002 | Misawa et al. | |
| 2002/0191952 | A1 | 12/2002 | Fiore et al. | |
| 2002/0196344 | A1 | 12/2002 | McIntyre et al. | |
| 2002/0197067 | A1 | 12/2002 | Ohnishi | |
| 2003/0007078 | A1 | 1/2003 | Feldis, III | |
| 2003/0018802 | A1 | 1/2003 | Romanik et al. | |
| 2003/0020814 | A1 | 1/2003 | Ono | |
| 2003/0021455 | A1 | 1/2003 | Dixon et al. | |
| 2003/0026596 | A1 | 2/2003 | Betti et al. | |
| 2003/0069898 | A1 | 4/2003 | Christodoulou et al. | |
| 2003/0072491 | A1 | 4/2003 | Sirivara et al. | |
| 2003/0080878 | A1 * | 5/2003 | Kirmuss | 340/936 |
| 2003/0081140 | A1 | 5/2003 | Furukawa | |
| 2003/0103144 | A1 | 6/2003 | Sesek et al. | |
| 2003/0112261 | A1 | 6/2003 | Zhang | |
| 2003/0112354 | A1 | 6/2003 | Ortiz et al. | |
| 2003/0113014 | A1 | 6/2003 | Katoh | |
| 2003/0117642 | A1 | 6/2003 | Haraguchi | |
| 2003/0131002 | A1 | 7/2003 | Gennetten et al. | |
| 2003/0152263 | A1 | 8/2003 | Kawano et al. | |
| 2003/0160870 | A1 | 8/2003 | Ziemkowski | |
| 2003/0206232 | A1 | 11/2003 | Suzuki et al. | |
| 2003/0222998 | A1 | 12/2003 | Yamauchi et al. | |
| 2003/0236674 | A1 | 12/2003 | Henry, Jr. | |
| 2004/0017333 | A1 | 1/2004 | Cooper et al. | |
| 2004/0042679 | A1 | 3/2004 | Yamada | |
| 2004/0066968 | A1 | 4/2004 | Glickman | |
| 2004/0070678 | A1 | 4/2004 | Toyama et al. | |
| 2004/0075750 | A1 | 4/2004 | Bateman | |
| 2004/0085456 | A1 | 5/2004 | Kwag et al. | |
| 2004/0095474 | A1 | 5/2004 | Matsufune | |
| 2004/0120562 | A1 | 6/2004 | Hays et al. | |
| 2004/0123131 | A1 | 6/2004 | Zacks et al. | |
| 2004/0131282 | A1 | 7/2004 | Yoshida et al. | |
| 2004/0174454 | A1 | 9/2004 | Okamura | |
| 2004/0179121 | A1 | 9/2004 | Silverstein | |
| 2004/0183903 | A1 | 9/2004 | Pedersen | |
| 2004/0201690 | A1 | 10/2004 | Bryant et al. | |
| 2004/0201709 | A1 | 10/2004 | McIntyre et al. | |
| 2004/0216173 | A1 | 10/2004 | Horoszowski et al. | |
| 2004/0218894 | A1 | 11/2004 | Harville et al. | |
| 2004/0239958 | A1 | 12/2004 | Nagata et al. | |
| 2004/0252193 | A1 | 12/2004 | Higgins | |
| 2004/0257462 | A1 | 12/2004 | Goris et al. | |
| 2004/0263658 | A1 | 12/2004 | Cozier et al. | |
| 2005/0013602 | A1 | 1/2005 | Ogawa | |
| 2005/0018053 | A1 | 1/2005 | Suga et al. | |
| 2005/0036033 | A1 | 2/2005 | Imai | |
| 2005/0103863 | A1 | 5/2005 | Zhu et al. | |
| 2005/0158015 | A1 | 7/2005 | Nakayama et al. | |
| 2005/0169367 | A1 * | 8/2005 | Venetianer et al. | 375/240.01 |
| 2005/0187901 | A1 | 8/2005 | Maritzen et al. | |
| 2005/0193421 | A1 | 9/2005 | Cragun | |
| 2005/0212950 | A1 | 9/2005 | Kanai | |
| 2005/0231625 | A1 | 10/2005 | Parulski et al. | |
| 2005/0262097 | A1 | 11/2005 | Sim-Tang et al. | |
| 2005/0271251 | A1 * | 12/2005 | Russell et al. | 382/103 |
| 2006/0023066 | A1 | 2/2006 | Li et al. | |
| 2006/0044398 | A1 | 3/2006 | Foong et al. | |
| 2006/0044416 | A1 | 3/2006 | Miyazaki et al. | |
| 2006/0044444 | A1 | 3/2006 | Okamoto et al. | |

| | | | |
|---|---|---|---|
| 2006/0092291 | A1 | 5/2006 | Bodie |
| 2006/0098112 | A1 | 5/2006 | Kelly |
| 2006/0109349 | A1 | 5/2006 | Takashima |
| 2006/0125922 | A1 | 6/2006 | Albert et al. |
| 2006/0143665 | A1 | 6/2006 | Meek et al. |
| 2006/0173756 | A1* | 8/2006 | Benight .......................... 705/28 |
| 2006/0192887 | A1 | 8/2006 | Miyamaki et al. |
| 2007/0100860 | A1* | 5/2007 | Jung et al. ..................... 707/101 |
| 2008/0023232 | A1 | 1/2008 | Morag et al. |

FOREIGN PATENT DOCUMENTS

| | | |
|---|---|---|
| JP | 2001-309236 A | 11/2001 |
| JP | 2002-094862 A | 3/2002 |
| JP | 2003-009044 A | 1/2003 |
| WO | WO 2005/078597 A1 | 8/2005 |

OTHER PUBLICATIONS

PCT International Search Report; International App. No. PCT/US06/42584; pp. 1-2; Sep. 28, 2007.
U.S. Appl. No. 11/594,695, Levien et al.
U.S. Appl. No. 11/591,435, Jung et al.
U.S. Appl. No. 11/541,382, Jung et al.
U.S. Appl. No. 11/526,886, Jung et al.
U.S. Appl. No. 11/510,139, Jung et al.
U.S. Appl. No. 11/508,554, Jung et al.
U.S. Appl. No. 11/506,760, Jung et al.
U.S. Appl. No. 11/475,516, Levien et al.
U.S. Appl. No. 11/455,001, Jung et al.
U.S. Appl. No. 11/440,409, Levien et al.
U.S. Appl. No. 11/437,284, Levien et al.
U.S. Appl. No. 11/404,381, Levien et al.
U.S. Appl. No. 11/404,104, Levien et al.
U.S. Appl. No. 11/397,357, Levien et al.
U.S. Appl. No. 11/190,516, Jung et al.
U.S. Appl. No. 11/143,970, Jung et al.
PCT International Search Report; International App. No. PCT/US06/42699; dated Sep. 18, 2008; pp. 1-5.
PCT International Search Report; International App. No. PCT/US06/42841; dated Sep. 15, 2008; pp. 1-2.
PCT International Search Report; International App. No. PCT/US07/04934; dated Sep. 12, 2008; pp. 1-2.
PCT International Search Report; International App. No. PCT/US06/42728; Jul. 7, 2008; pp. 1-2.
PCT International Search Report; International App. No. PCT/US06/23048; Jul. 18, 2008; pp. 1-2.
European Search Report; European App. No. EP 07751674.8; May 27, 2009; pp. 1-5.
"Federal Standard 1037C Telecommunications: Glossary of Telecommunication Terms"; Bearing a date of Aug. 7, 1996; printed on May 30, 2009; total of 8 pages; General Services Administration Information Technology Service, Federal Standard 1037C.
"Merriam-Webster Collegiate Dictionary"; Bearing dates of 1993 and 1997; total of 3 pages; Merriam-Webster, Inc., Tenth Edition; Springfield, Massachusetts, USA.
"Kodak Unveils World's First Dual-Lens Digital Camera; Combines Ultra-Wide Angle and Zoom Lenses in Compact Body"; Kodak; Bearing a date of Jan. 2, 2006; pp. 1-2; located at: http://www.kodak.com/eknec/PageQuerier.jhtml?pq-path=2709&pq-locale=en_US&gpcid=0900688a80465805; printed on Mar. 7, 2006.
Reichmann, Michael; "Understanding Raw Files"; Luminous-landscape.com; Printed on Oct. 25, 2005; pp. 1-9; located at: http://www.luminous-landscape.com/tutorials/understanding-series/u-raw-files.shtml.
"Sanyo Xacit VPC-HD1 5.1MP MPEG4 High Definition Camcorder w/10x Optical Zoom: Product Description"; Bearing dates of 1996-2006; pp. 1-5; located at: http://www.amazon.com/gp/product/product-description/B000E0E6YC/ref=dp_nav_2/002-0210595-1654445?%5Fencoding=UTF8&n=502394&s=photo; printed on Mar. 7, 2006; Amazon.com.
"What is storage device?—A Word Definition From the Webopedia Computer Dictionary"; Webopedia.com; Bearing dates of Oct. 30, 2001 and 2005, printed on Oct. 25, 2005; pp. 1-4; located at: http://www.webopedia.com/TERM/S/storage_device.htm.
PCT International Search Report; International App. No. PCT/US 07/08341; Feb. 7, 2008; pp. 1-2.
PCT International Search Report; International App. No. PCT/US 07/08342; Feb. 7, 2008; pp. 1-2.
PCT International Search Report; International App. No. PCT/US 06/42734; Mar. 26, 2008; pp. 1-2.
U.S. Appl. No. 12/290,538, Jung et al.
U.S. Appl. No. 12/284,202, Jung et al.
U.S. Appl. No. 12/283,420, Jung et al.
U.S. Appl. No. 13/135,255, Jung, et al.

* cited by examiner

FIG. 3B

| 3A | 3B |
Key To FIG. 3

310
accepting input of a designation of a beginning designator of an image/sound at the reference designator as the beginning demarcation designator in the video/audio data stream 312
accepting input of a designation of an ending designator of a latest image/sound prior to the reference designator as the beginning demarcation designator in the video/audio data stream 314
accepting input for a designation of an ending designator of an image/sound at the reference designator as the ending demarcation designator in the video/audio data stream 316
accepting input of a designation of a relative motion/ silence after an image/sound at the reference designator as the ending demarcation designator in the video/audio data stream 318
accepting input of a designation of a relative motion/ silence after an image/sound at the reference designator as the ending demarcation designator in the video/audio data stream

200

A

B

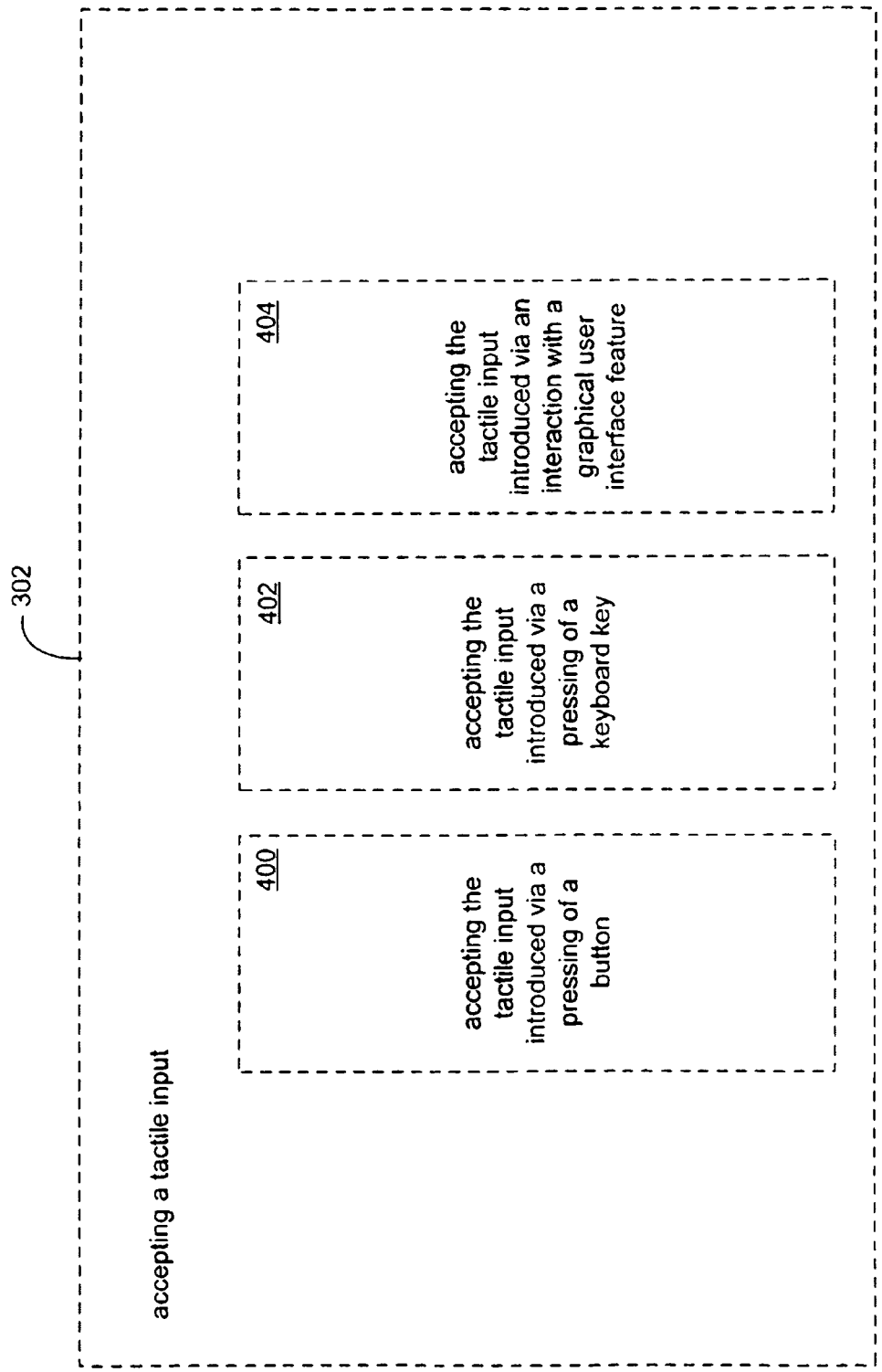

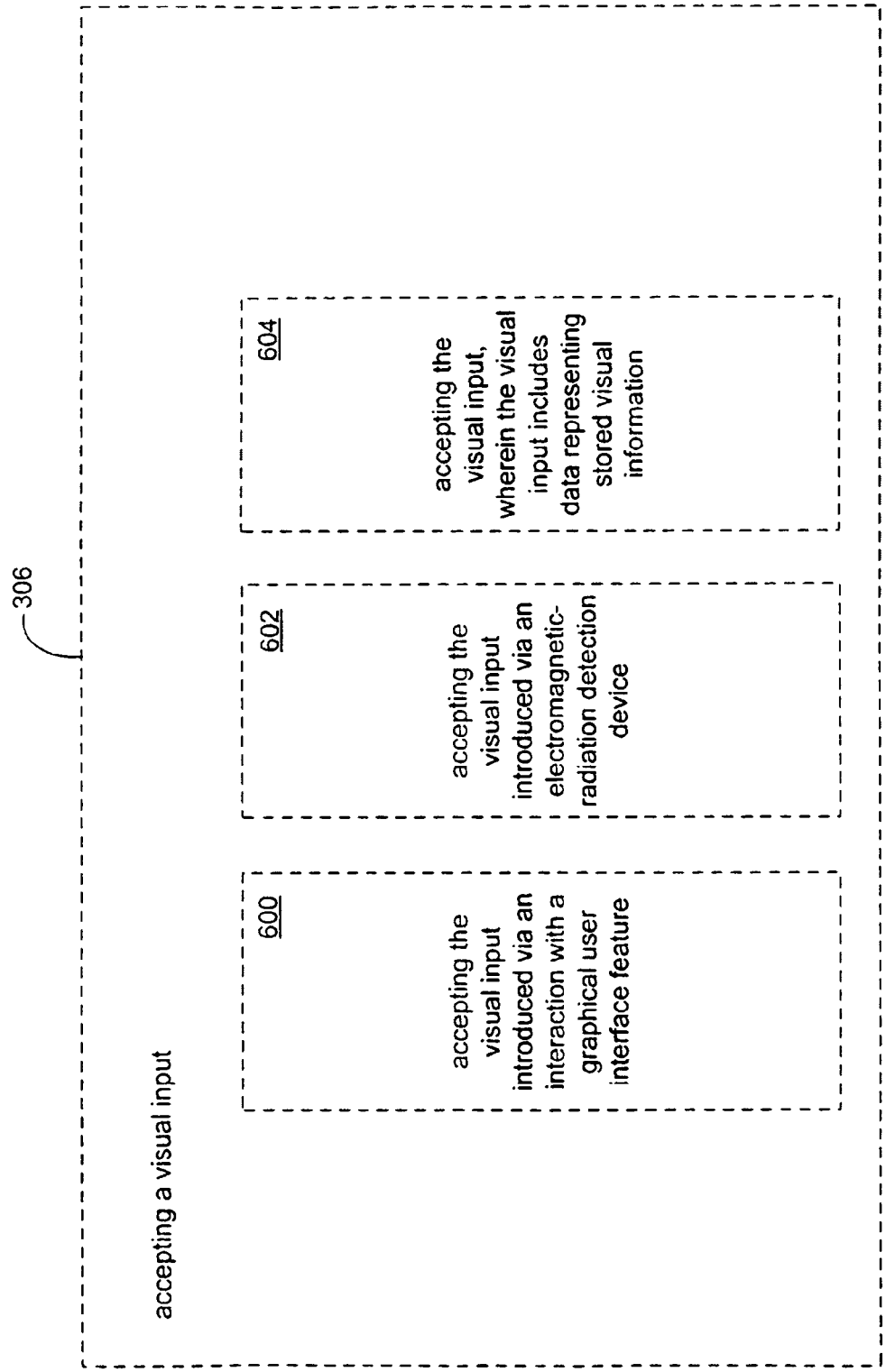

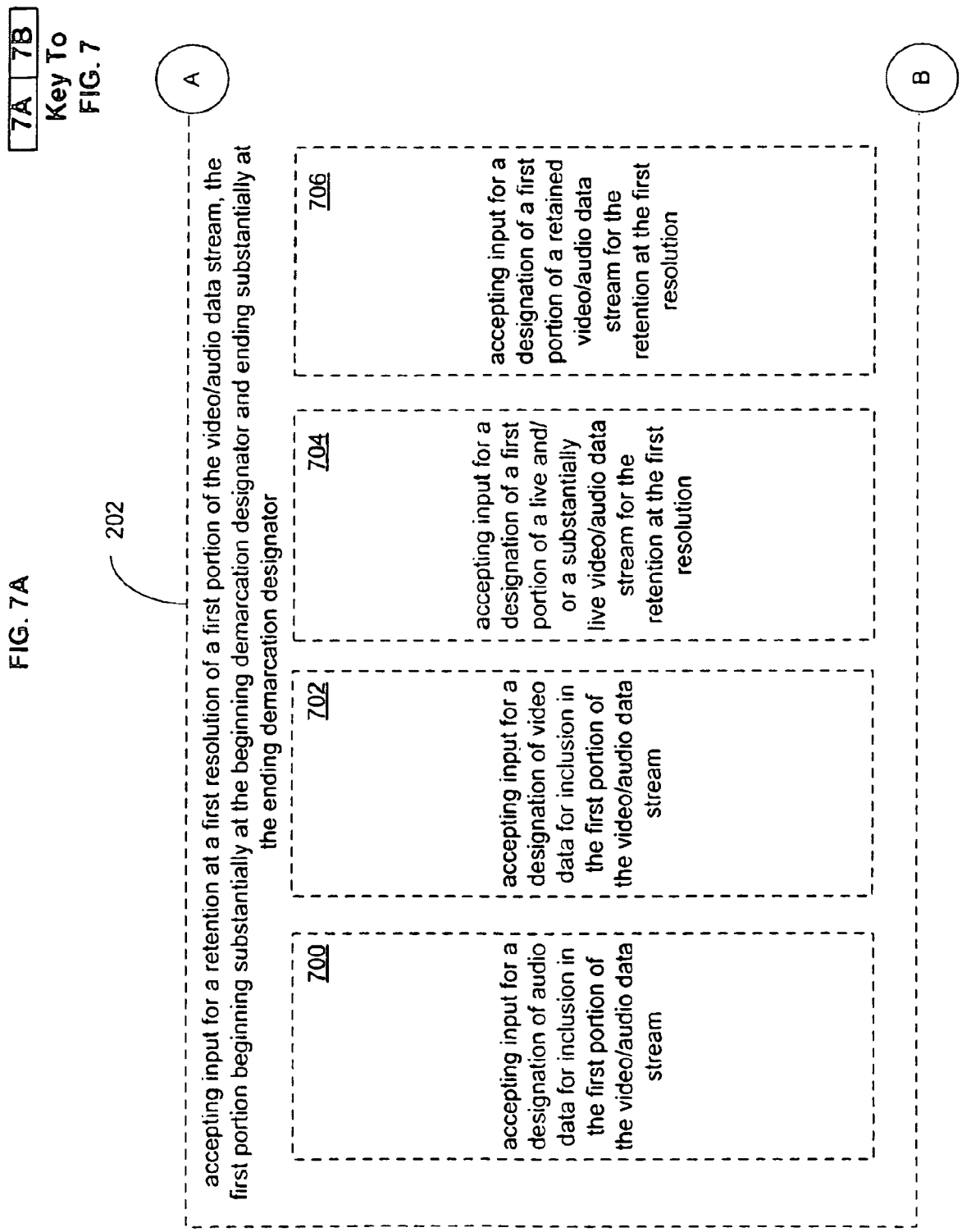

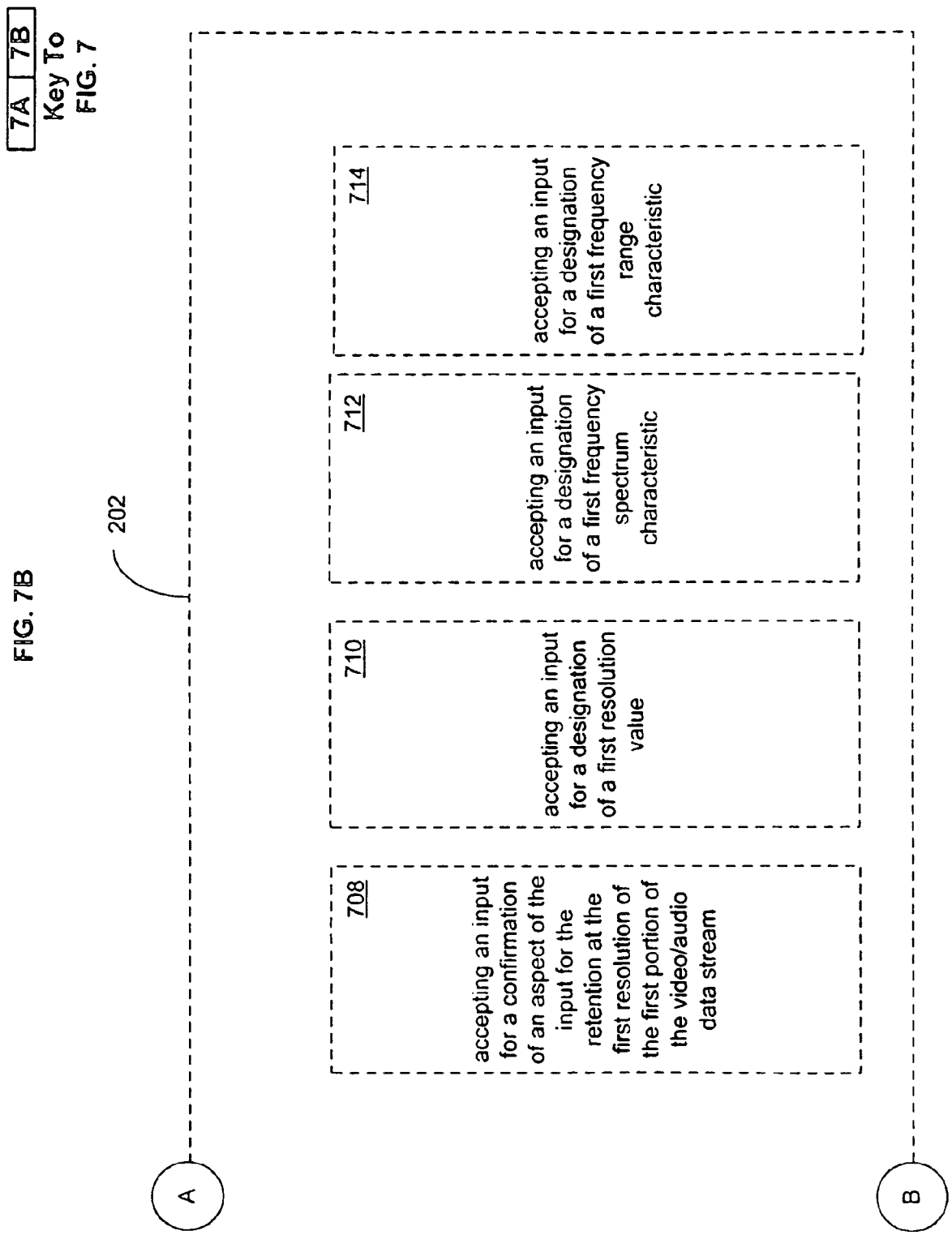

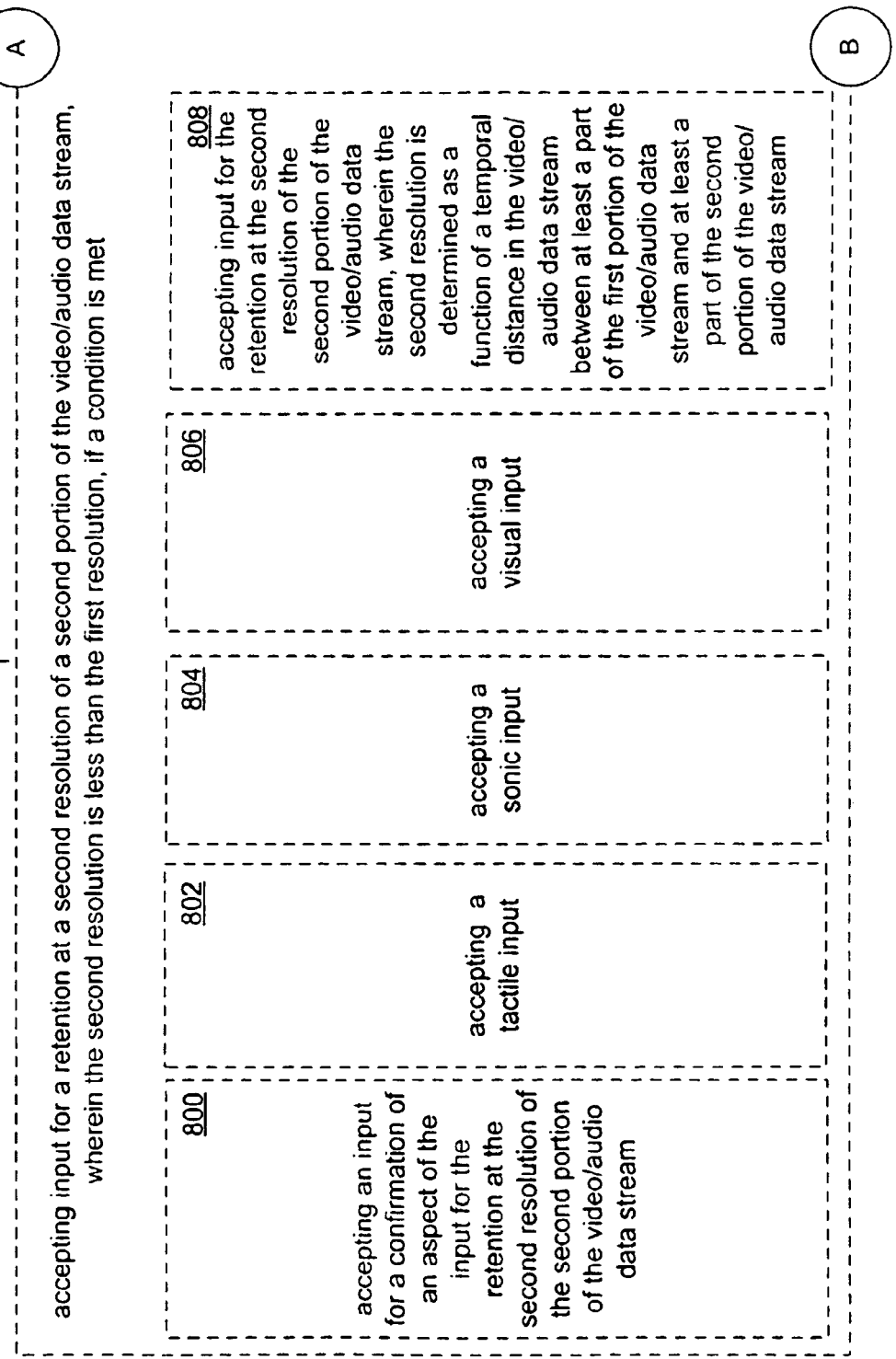

FIG. 8B

Key To FIG. 8

| 8A | 8B | 8C | 8D |

810 accepting input for the retention at the second resolution of the second portion of the video/audio data stream, wherein the retention at the second resolution is to be performed if a preselected time has elapsed after a specified previous retention of the second portion of the video/audio data stream

812 accepting input for the retention at the second resolution of the second portion of the video/audio data stream, wherein the retention at the second resolution is to be performed if a time value is framed by a preselected time window

814 accepting input for the retention at the second resolution of the second portion of the video/audio data stream, wherein the retention of the second portion of the video/audio data stream at the second resolution is to be performed if at least one of an available storage space is less than a preselected amount, a condition established by a user is met, and/or a criterion corresponding to a storage management algorithm is met

816 shows accepting input for the retention at the second resolution of the second portion of the video/audio data stream if a condition responsive to an examination of at least one other retained set of video and/or audio data is met

818 accepting input for the retention at the second resolution of the second portion of the video/audio data stream, wherein the retention of the second portion of the video/audio data stream at the second resolution is to be performed if a condition is met, wherein the condition is related to one or more of a set of events and/or conditions excluding a specified previous retention of the second portion of the video/audio data stream

FIG. 8C

| 8A | 8B | 8C | 8D |

Key To
FIG. 8

820
accepting input for the retention at the second resolution of the second portion of the video/audio data stream, wherein the retention of the second portion of the video/audio data stream at the second resolution is to be performed if a condition responsive to data received from a device other than a device used for a specified previous retention of the second portion of the video/audio data stream is met

822
accepting input for the retention at the second resolution of the second portion of the video/audio data stream, wherein the retention of the second portion of the video/audio data stream at the second resolution is to be performed if a condition responsive to data received from a device other than a device used for the retention of the second portion of the video/audio data stream at the second resolution is met

824
accepting input for the retention at the second resolution of the second portion of the video/audio data stream, wherein the method includes a method implemented in a first device, and wherein the retention of the second portion of the video/audio data stream at the second resolution is to be performed if a condition responsive to data received from a second device is met

826
accepting input for a designation of audio data for inclusion in the second portion of the video/audio data stream

828
accepting input for a designation of video data for inclusion in the second portion of the video/audio data stream

FIG. 8D

| 8A | 8B | 8C | 8D |

Key To
FIG. 8

— 204

830
illustrates accepting input for a designation of a second portion of a live and/or a substantially live video/audio data stream for the retention at the second resolution 832
accepting input for a designation of a second portion of a retained video/audio data stream for the retention at the second resolution 834
accepting an input for a designation of a second resolution value 836
accepting an input for a designation of a second frequency spectrum characteristic 838
accepting an input for a designation of a second frequency range characteristic

E

F

PRESERVATION AND/OR DEGRADATION OF A VIDEO/AUDIO DATA STREAM

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/263,587, entitled Saved Image Management, naming Royce A. Levien, Robert W. Lord, and Mark A. Malamud, as inventors, filed Oct. 31, 2005 now U.S. Pat. No. 7,872,675, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/264,701, entitled Conditional Alteration of a Saved Image, naming Royce A. Levien, Robert W. Lord, and Mark A. Malamud, as inventors, filed Nov. 1, 2005, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/364,496, entitled Imagery Processing, naming Edward K. Y. Jung, Royce A. Levien, Robert W. Lord, Mark A. Malamud, and John D. Rinaldo, Jr., as inventors, filed Feb. 28, 2006, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/376,627, entitled Data Management of a Data Stream, naming Edward K. Y. Jung, Royce A. Levien, Robert W. Lord, Mark A. Malamud, and John D. Rinaldo, Jr., as inventors, filed Mar. 15, 2006 now abandoned, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/396,279, entitled Data Management of an Audio Data Stream, naming Edward K. Y. Jung, Royce A. Levien, Robert W. Lord, Mark A. Malamud, and John D. Rinaldo, Jr., as inventors, filed Mar. 31, 2006 now abandoned, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/413,271, entitled Data Management of Audio Aspects of a Data Stream, naming Edward K. Y. Jung, Royce A. Levien, Robert W. Lord, Mark A. Malamud, and John D. Rinaldo, Jr., as inventors, filed Apr. 28, 2006 now abandoned, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/434,568, entitled Degradation/Preservation Management of Captured Data, naming Edward K. Y. Jung, Royce A. Levien, Robert W. Lord, Mark A. Malamud, and John D. Rinaldo, Jr., as inventors, filed May 15, 2006, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present application relates, in general, to data management.

SUMMARY

In one aspect, a method related to data management includes but is not limited to accepting input for a designation of a reference designator and a beginning demarcation designator and/or an ending demarcation designator in a video/audio data stream, wherein the beginning demarcation designator and/or the ending demarcation designator are defined relative to the reference designator; and accepting input for a retention at a first resolution of a first portion of the video/audio data stream, the first portion beginning substantially at the beginning demarcation designator and ending substantially at the ending demarcation designator. In addition to the foregoing, other method aspects are described in the claims, drawings, and text forming a part of the present application.

In one aspect, a method related to data management includes but is not limited to accepting input to specify a location in the video/audio data stream and to initiate a retention at a first resolution of a first portion of a video/audio data stream, the first portion to include the location; and retaining the first portion of the video/audio data stream at the first resolution, the first portion to include at least a part of the video/audio data stream after the location. In addition to the foregoing, other method aspects are described in the claims, drawings, and text forming a part of the present application.

In one aspect, a system related to data management includes but is not limited to circuitry for accepting input for a designation of a reference designator and a beginning demarcation designator and/or an ending demarcation designator in a video/audio data stream, wherein the beginning demarcation designator and/or the ending demarcation designator are defined relative to the reference designator; and circuitry for accepting input for a retention at a first resolution of a first portion of the video/audio data stream, the first portion beginning substantially at the beginning demarcation designator and ending substantially at the ending demarcation designator. In addition to the foregoing, other system aspects are described in the claims, drawings, and text forming a part of the present application.

In one aspect, a system related to data management includes but is not limited to circuitry for accepting input to specify a location in the video/audio data stream and to initiate a retention at a first resolution of a first portion of a video/audio data stream, the first portion to include the location; and circuitry for retaining the first portion of the video/audio data stream at the first resolution, the first portion to include at least a part of the video/audio data stream after the location. In addition to the foregoing, other system aspects are described in the claims, drawings, and text forming a part of the present application.

In one or more various aspects, related systems include but are not limited to circuitry and/or programming and/or electro-mechanical devices and/or optical devices for effecting the herein-referenced method aspects; the circuitry and/or programming and/or electro-mechanical devices and/or optical devices can be virtually any combination of hardware, software, and/or firmware configured to effect the herein-referenced method aspects depending upon the design choices of the system designer skilled in the art.

In one aspect, a program product includes but is not limited to a signal bearing medium bearing one or more instructions for accepting input for a designation of a reference designator and a beginning demarcation designator and/or an ending demarcation designator in a video/audio data stream, wherein the beginning demarcation designator and/or the ending demarcation designator are defined relative to the reference designator; and one or more instructions for accepting input for a retention at a first resolution of a first portion of the video/audio data stream, the first portion beginning substantially at the beginning demarcation designator and ending substantially at the ending demarcation designator. In addition to the foregoing, other program product aspects are described in the claims, drawings, and text forming a part of the present application.

In one aspect, a program product includes but is not limited to a signal bearing medium bearing one or more instructions for accepting input to specify a location in the video/audio data stream and to initiate a retention at a first resolution of a first portion of a video/audio data stream, the first portion to include the location; and one or more instructions for retaining the first portion of the video/audio data stream at the first resolution, the first portion to include at least a part of the video/audio data stream after the location. In addition to the foregoing, other program product aspects are described in the claims, drawings, and text forming a part of the present application.

In addition to the foregoing, various other method, system, and/or program product aspects are set forth and described in the teachings such as the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 4 shows several alternative implementations of the high-level logic flowchart of FIG. 3;

FIG. 6 depicts several alternative implementations of the high-level logic flowchart of FIG. 3;

FIG. 7 depicts several alternative implementations of the high-level logic flowchart of FIG. 2;

FIG. 8 illustrates several alternative implementations of the high-level logic flowchart of FIG. 2;

The use of the same symbols in different drawings typically indicates similar or identical items.

DETAILED DESCRIPTION

Figure 1A:
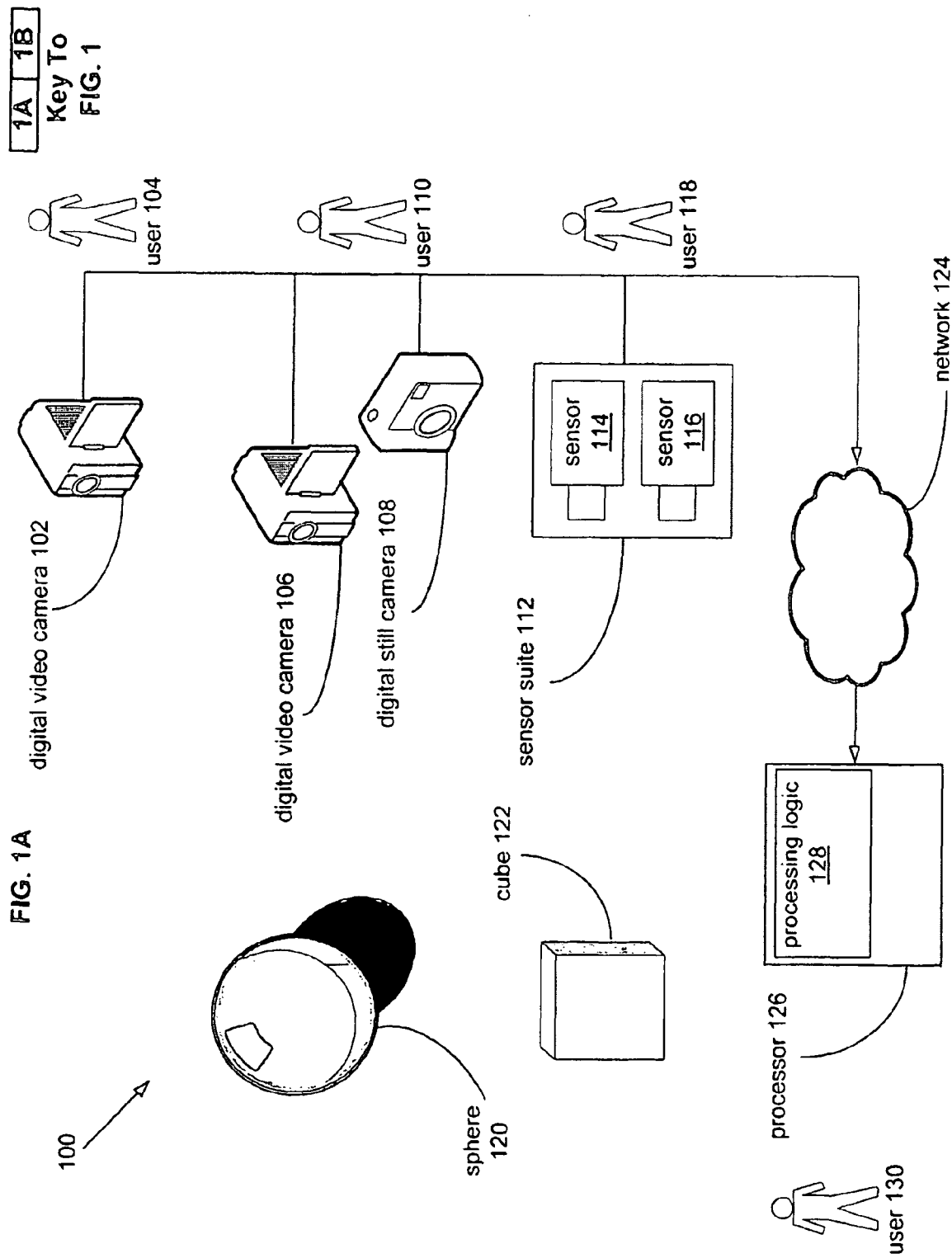
FIG. 1 depicts two exemplary environments in which the methods and systems described herein may be represented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1B:
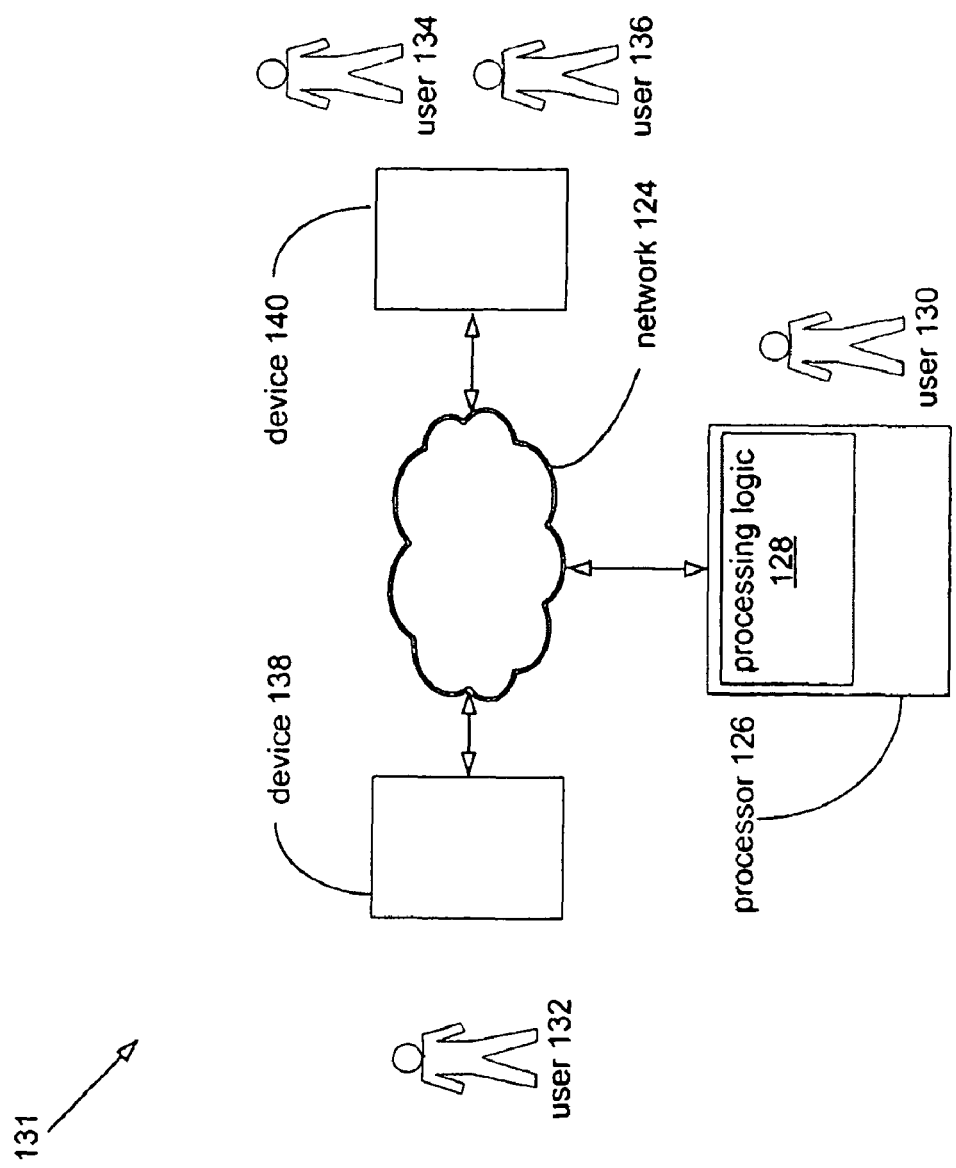

FIG. 1 depicts two exemplary environments in which the methods and systems described herein may be represented. In the depicted exemplary environment 100, illustrated are a variety of exemplary sensors: a digital video camera 102 operated by one or more users represented by user 104, where the digital video camera 102 may have a capability to record audio input; a digital video camera 106 used in conjunction with a digital still camera 108, where the digital video camera 106 and/or digital still camera 108 may either or both have a capability to record audio input, both operated by one or more users represented by user 110; and a sensor suite 112 comprising more than one sensor represented by sensor 114 and sensor 116 (wherein the sensors 114 and 116 may be but need not be physically co-located, and may be but need not be of the same type, e.g., sensor 114 may be an infrared device and sensor 116 may be a radar device, or, e.g. sensor 114 may be a microphone and the sensor 116 may be an infrared/visible light device), the sensor suite being operated by one or more users represented by user 118. Taken by themselves, each of the sensors 114 and 116 are exemplary of single independent sensors, and further, either of the sensors 114 or 116 may be audio sensors. The exemplary sensors may represent a variety of devices for the detection and/or the recording and/or the transmission of imagery aspects, e.g., images, and/or audio aspects, e.g., instances of particular voices and/or instances of particular sounds, including but not limited to microphones, digital video cameras, digital still cameras, digital sensor (e.g. CCD or CMOS) arrays, and radar sets. The exemplary users 104, 110, and/or 118 may, for example, operate the exemplary sensors manually or may supervise and/or monitor their automatic operation. The exemplary users 104, 110, and/or 118 may operate the exemplary sensors in physical proximity to the sensors or remotely. The exemplary sensors may also operate autonomously without exemplary users 104, 110, and/or 118.

The exemplary sensors may be used to detect and/or record and/or transmit images and/or sounds and/or other data related to a wide variety of objects, represented in FIG. 1 by exemplary objects, a sphere 120 and a cube 122. The sphere 120 and/or the cube 122 may be reflectors and/or emitters of electromagnetic radiation such as visible light and/or microwaves, reflectors and/or emitters of particulate radiation such as electrons and/or neutrons, and/or reflectors and/or emitters of sonic energy. The sphere 120 and the cube 122 are representative of any object(s) or groups of objects, images and/or emitting and/or reflecting sources of sounds and/or other related data which may be detectable and/or recordable and/or transmissible by the exemplary sensors, including but not limited to persons, animals, buildings, roads, automobiles, trucks, aircraft, ships, spacecraft, landscape and/or seascape features, vegetation, and/or celestial objects. When used together in any given example herein, the exemplary sphere 120 and the exemplary cube 122 generally represent two distinct objects which may or may not be of the same or of a similar type, except where otherwise required by the context, e.g., a sphere 120 and a cube 122 used together in an example may represent a first particular object and a second particular object, e.g., a particular person and a particular building, or a particular first aircraft and a particular second aircraft, respectively. When used alone in any given example herein, the designated exemplary object, e.g., the sphere 120 or the cube 122, generally represents the same object, except where otherwise required by the context, e.g., a sphere 120 used alone in an example generally represents a single object, e.g., a single building, and a cube 122 used alone generally represents a single object, e.g., a particular person.

Each of the exemplary sensors may detect and/or record and/or transmit images and/or sounds and/or other related data of the exemplary objects in a variety of combinations and sequences. For instance, the digital video camera 102 may detect and/or record and/or transmit an image and/or sound and/or other related data of the sphere 120 and then an image and/or sound and/or other related data of the cube 122 sequentially, in either order; and/or, the digital video camera 106 may detect and/or record and/or transmit a single image and/or sound and/or other related data of the sphere 120 and the cube 122 together.

Similarly, the digital video camera 106 may detect and/or record and/or transmit an image and/or sound and/or other related data of the sphere 120 and of the cube 122 sequentially, in either order, and/or of the sphere 120 and the cube 122 together, before, after, partially simultaneously with, or simultaneously with an operation of the digital still camera 108. The digital still camera 108 may detect and/or record and/or transmit an image and/or sound and/or other related data of the sphere 120 and of the cube 122 sequentially, in either order, and/or of the sphere 120 and the cube 122 together, before, after, partially simultaneously with, or simultaneously with an operation of the digital video camera 106.

Similarly, the sensor 114 and the sensor 116 of the sensor suite 112 may detect and/or record and/or transmit an image and/or sound and/or other related data of the sphere 120 and of the cube 122 sequentially, in either order, and/or of the sphere 120 and the cube 122 together, before, after, partially simultaneously with, or simultaneously with respect to each other.

Such images and/or sounds and/or related data may be recorded and/or transmitted via a computer or computers represented by the network 124 and/or directly to a processor 126 and/or processing logic 128, which accept data representing imagery aspects and/or sounds and/or related data pertaining to the exemplary objects. The processor 126 represents one or more processors that may be, for example, one or more computers, including but not limited to one or more laptop computers, desktop computers, and/or other types of computers. The processing logic 128 may be software and/or hardware and/or firmware associated with the processor 126 and capable of accepting and/or processing data representing imagery and/or sounds and/or other related data aspects of the exemplary objects from the exemplary sensors and from memory in the case of data stored in memory. Such processing may include but is not limited to comparing at least a portion of the data from one sensor with at least a portion of the data from the other sensor, and/or applying a mathematical process and/or heuristic process to at least a portion of the data from one sensor with at least a portion of the data from the other sensor, and/or accepting input related to the analysis, manipulation, and/or retention of data from the sensors, including but not limited to live, substantially live, and/or retained data, e.g., stored in memory. Such processing may also include, but is not limited to, deriving third data from the combining at least a portion of the data from one sensor with at least a portion of the data from another sensor.

The digital video camera 102, the digital video camera 106, the sensor 114 and/or the sensor 116 (operating as components of sensor suite 112 or separately as single independent sensors) may be capable of detecting and/or recording and/or transmitting information representing audio input and accepting input representing information for the manipulation and/or retention of such audio information, including but not limited to accepting input for a designation of a reference designator in a video/audio data stream (e.g., a data stream including video and/or audio information) originating from one of the exemplary sensors via detection and/or transmission and/or playback; accepting input for a designation of a temporal beginning designator and/or a beginning demarcation designator in such a video/audio data stream; accepting input for a designation of a temporal ending designator and/or an ending demarcation designator in such a video/audio data stream; and accepting input for retaining at a high resolution a portion of such a video/audio data stream beginning substantially at the temporal beginning designator and/or the beginning demarcation designator and ending substantially at the temporal ending designator and/or the ending demarcation designator. Such input may include confirmation of previous input. Further, the processor 126 and/or the processing logic 128 may be capable of receiving such a video/audio data stream from the exemplary sensors and/or from other computing resources and/or capable of playback of such a video/audio data stream that has been previously retained within the processor 126 and/or the processing logic 128 and/or elsewhere. In addition, processor 126 and/or the processing logic 128 may be capable of accepting input representing information for the manipulation and/or retention of such audio information, including the input described herein in connection with the exemplary sensors.

In accepting input, an embodiment may accept input initiated in a variety of ways, including but not limited to initiation by one or more human users such as the users 104, 110, 118, and/or 130; by the action of one or more processors and/or processing logic integral with, associated with, and/or operably coupled to a device such as the digital video camera 102; by the action of a one or more processors such as the processor 126 and/or by processing logic such as the processing logic 128; and/or by a combination of human and processor/processing logic interaction, such as a user 130 interacting with the digital still camera 108 and/or the processor 126 and/or the processing logic 128.

Accepting input from one or more human users such as the users 104, 110, 118, and/or 130 may include but is not limited to accepting input initiated by interaction with various interface devices such as computer mouse devices, keyboards, and graphical user interfaces; with interface devices that detect sound, such as microphones; with interface devices that detect electromagnetic radiation, such as visible and/or infrared light sensors and cameras; and with interface devices that present visual interface features such as graphical user interfaces.

Accepting input initiated by the action of one or more processors and/or processing logic, such as the processor 126 and/or the processing logic 128 may include but is not limited to accepting input initiated by a processor and/or processor logic analysis of a data stream including detection of video/imagery/audio data that satisfies certain conditions and/or parameters that require or indicate the usefulness of designation of those aspects or of reference points indicating the presence and/or limits of those aspects. For example, the processor 126 and/or the processing logic 128 may, in an analysis of a video/imagery/audio data stream, whether the stream be live, substantially live, or retained data, detect the beginning of voice of a particular person of interest whose vocal characteristics are available to the processor 126 and the processing logic 128 and which are used to define detection/recognition parameters, and the processor 126 and/or the processing logic 128 may, upon detection of the voice using those parameters, initiate input to designate a portion of the data stream including the voice for retention.

Accepting input initiated by a combination of human and processor/processing logic interaction, such as a user 130 interacting with the digital still camera 108 and/or the processor 126 and/or the processing logic 128, may include but is not limited to a user such as user 110 interacting with the digital video camera 106, the processor 126, and the processing logic 128 to review a video/imagery/audio data stream, detect video/imagery/audio aspects of interest such as images and voices of particular people and to designate for retention, command retention of, and retain those aspects of interest.

With regard to accepting input designating a video/imagery aspect and/or an audio aspect of a video/audio data stream, such input may represent an indication from an exemplary user 104, 110, 118, and/or 130, or from the processor 126 and/or the processing logic 128, of a video/imagery aspect and/or an audio aspect, e.g., video/imagery/audio information of interest, such as a particular human voice or a particular mechanical sound, e.g., an auto engine, or the relative absence of sound, such as a relative silence between two human speakers or two musical phrases, and/or an image of a particular person of interest. Such designation may be for the purpose or purposes of, e.g., retention at high resolution, interactive review of the portion of the video/audio data stream of interest, or analysis of the portion of interest. A video/imagery aspect and/or an audio aspect may be characterized at least in part by a temporal beginning, a temporal ending, an intensity and/or range of intensities and/or distribution of intensities, a frequency and/or range of frequencies and/or distribution of frequencies.

With regard to input for a designation of a reference designator in a video/audio data stream, such input may represent an indication from an exemplary user 104, 110, 118, and/or 130, or from the processor 126 and/or the processing logic 128, of video/imagery/audio information of interest, such as a particular human voice or a particular mechanical sound, e.g., an auto engine, or the relative absence of sound, such as a relative silence between two human speakers or two musical phrases, or an image of a particular object of interest. The reference designator may be designated in the video/audio data stream such that it falls within and/or references a place within the portion of the video/audio data stream comprising the particular video/imagery/audio aspect of interest. The reference designator may be designated via initiating input in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in a video/audio data stream satisfies some criteria for video/imagery/audio data of interest.

With regard to input for designation of a temporal beginning designator and/or a beginning demarcation designator in a video/audio data stream, such input may represent an indication from an exemplary user 104, 110, 118, and/or 130, or from the processor 126 and/or the processing logic 128, of a point in the video/audio data stream at which a portion of interest of the video/audio data stream begins, such as (but not limited to) the end a relative silence (e.g., silence except for background and/or artifact noise) occurring last before a designated reference designator, the beginning of the sound of interest or of one or more of the sounds accompanying a sound of interest, or the end of a sound occurring last before a designated reference designator, or the beginning of a video image of a particular person of interest. The temporal beginning designator and/or the beginning demarcation designator may be designated in the video/audio data stream such that it falls within and/or references a place at or near the beginning of the portion of the video/audio data stream comprising the particular sound of interest. The temporal beginning designator and/or the beginning demarcation designator may be designated via initiating input in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in a video/audio data stream satisfies some criteria for demarcation of video/imagery/audio data of interest.

With regard to input for designation of a temporal ending designator and/or an ending demarcation designator in a video/audio data stream, such input may represent an indication from an exemplary user 104, 110, 118, and/or 130, or from the processor 126 and/or the processing logic 128, of a point in the video/audio data stream at which a portion of interest of the video/audio data stream ends. The temporal ending designator and/or the ending demarcation designator may represent the point in the video/audio data stream falling at the end of a portion of interest, such as (but not limited to) the end of the presence of an image of a vehicle of interest, the end a relative silence (e.g., silence except for background and/or artifact noise) occurring just after the end of the sound of interest or of one or more of the sounds accompanying a sound of interest, or the end of a sound occurring just after a designated reference designator. The temporal ending designator and/or the ending demarcation designator may be designated in the video/audio data stream such that it falls within and/or references a place at or near the end of the portion of the video/audio data stream comprising the particular sound of interest. The temporal ending designator and/or the ending demarcation designator may be designated via initiating input in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in a video/audio data stream satisfies some criteria for video/imagery/audio data of interest.

With regard to input for retaining at a high resolution a portion of a video/audio data stream, including but not limited to a video/imagery/audio aspect of a video/audio data stream, such high resolution retention includes but is not limited to storage of a relatively large amount of data, compared to storage of portions of the data stream not selected for high resolution retention, as described herein. Such input may include but is not limited to designation of a high resolution value, e.g., 0.5 MB/second, and/or frequency spectrum characteristics, e.g., lower and upper frequency cut-offs. For example, the user 130 may provide input to the processor 126 and/or the processing logic 128 to identify a portion of a video/audio data stream for retention at high resolution, e.g., input designating an audio aspect of a video/audio data stream and/or input designating a video/imagery aspect of a video/audio data stream. The processor 126 and/or the processing logic 128 may accept the input, enabling the identified portion (e.g., a designated audio aspect) to be stored with high fidelity relative to the source video/audio and with a relatively small proportion of data (if any) discarded, while the portion or portions not selected for high resolution retention may be stored at a relatively lower resolution, e.g., with a relatively higher proportion of data discarded, e.g., to save storage resources.

Retention of a portion, e.g., a video/imagery/audio aspect, of a video/audio data stream at a relatively high resolution and retention of portions of the video/audio data stream not included in the portion designated for retention at the high resolution may result in storage of the portion not included in the portion to be retained at the high resolution at one or more resolutions that do not use all of the data available, such that the portion not to be retained at the high resolution is degraded in storage. Degradation of a portion not included in the portion retained or designated for retention at high resolution may be achieved by retaining the not-included portion at one or more lower resolutions, where the one or more lower resolutions may be a function of the distance in the video/audio data stream between the portion to be retained at a high resolution and the portion to be retained at one or more lower resolutions, including but not limited to degrading blocks of data not included in the high resolution portion according to their distance from the high resolution portion (e.g., degrading to one lower resolution a portion between 0 and 60 seconds from the high resolution portion, and degrading to another, even lower resolution a portion between 60 and 120 seconds from the high resolution portion, and so on). One or more inputs may be accepted to set one or more rules by which a portion of a video/audio data stream not included in a portion designated for high resolution retention is degraded and/or retained at one or more lower resolutions. One or more inputs for degradation may be accepted to specify parameters including but not limited to one or more specific resolution values (e.g., 12 kB/sec and/or 20 kB/sec), one or more frequency range characteristics, and/or one or more frequency distribution characteristics. Degradation to one or more lower resolutions may be correlated to one or more specified frequency ranges and/or one or more specified frequency distribution characteristics, such as specific lower resolutions for all sounds above 100 Hz, and/or between 2 kHz and 20 kHz, and/or below 5 kHz, and/or one or more specific lower resolutions for all sounds conforming to a specific frequency distribution characteristic of a particular human voice or musical instrument, and/or, with regard to video/imagery, specific lower resolution for parts of a video/audio data stream that do not include video/imagery of a particular color range. Degradation to one or more lower resolutions may be correlated to the time frame in which a portion of a video/audio data stream has been detected and/or recorded and/or transmitted and/or stored, e.g., video/audio data detected and/or recorded and/or transmitted and/or stored within a week may be retained at the resolution at which it was detected and/or recorded and/or transmitted and/or stored, while data detected and/or recorded and/or transmitted and/or stored between one and two weeks ago may be degraded to 80% of the resolution at which it was detected and/or recorded and/or transmitted and/or stored, and data detected and/or recorded and/or transmitted and/or stored between two and four weeks ago may be degraded to 60% of the resolution at which it was detected and/or recorded and/or transmitted and/or stored, and so on. One or more inputs may be accepted to confirm previous inputs or default values related to degrading data and/or retaining such data at a relatively lower resolution value. One or more inputs may be accepted for degrading a portion of a video/audio data stream not included in a portion designated for retention at high resolution. Inputs may include but not be limited to tactile, sonic, and/or visual inputs. Such an input may be initiated by an action by a user 104, 110, 118, or 130, e.g., pressing a mouse button and/or speaking into a microphone, or the input may be initiated by operation of some hardware/software/firmware, e.g., audio processing software such as the processor 126 and/or the processing logic 128, or it may be initiated by some combination of human and automated action.

In addition to accepting inputs for degrading to at least one lower resolution a portion of a video/audio data stream not included in a portion designated for retention at high resolution, degrading and/or retaining at a lower resolution a portion of a video/audio data stream not included in a portion designated for retention at high resolution may also be performed. Retention at one or more lower resolutions may be performed, e.g., by using one or more memory locations associated with and/or operably coupled to the digital video camera 102 and/or the digital video camera 106 and/or the sensor 114 and/or the sensor 116 and/or the processor 126 and/or the processing logic 128. Degradation may be performed by methods including but not limited to data compression and/or data redaction.

With respect to this example, input for the identification of a particular portion for retention at a relatively higher resolution does not preclude input for the storage of a distinct and/or an overlapping portion of the data stream at a distinct higher resolution compared to the retention resolution of one or more portions not identified for retention at a higher resolution, e.g., one or more portions of a data stream may be identified for retention at one or more relatively high resolutions. Similarly, input for the identification of a particular portion for retention at a relatively lower resolution does not preclude input for the storage of a distinct and/or an overlapping portion of the data stream at a distinct lower resolution compared to the retention resolution of one or more portions identified for retention at a higher resolution, e.g., one or more portions of a data stream may be identified for retention at one or more relatively lower resolutions.

Further, a video/imagery aspect may be designated for retention or retained at a particular resolution on the basis of a presence or absence of some audio aspect of a video/audio stream, and an audio aspect may be designated for retention or retained at a particular resolution on the basis of a presence or absence of some video/imagery aspect of a video/audio stream. For instance, the presence of an image of a particular person of interest in a video/audio data stream may serve as the basis for a designation of an audio aspect of the video/audio data stream for retention at high resolution, and vice versa.

A particular portion identified for retention at a high or a low resolution may include more than one data set that may generally be considered to constitute a "frame" in a video/audio data stream. With respect to this example, digital video cameras 102 and/or 106 are representative of any sensor or sensor suite capable of detecting and/or recording and/or transmitting video/audio input as one or more data streams representing the video/audio information. Such input may be initiated in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in a video/audio data stream satisfies some criteria for video/imagery/audio data of interest.

With regard to retaining at a high resolution a portion of a video/audio data stream, e.g., a video/imagery/audio aspect of the video/audio data stream, such retention may include storage in computer memory, such as memory associated with and/or operably coupled to the processor 126 and/or the processing logic 128.

The exemplary sensors may be capable of detecting and/or recording and/or transmitting one or more imagery and/or sound and/or other related data aspects of the exemplary objects, the one or more imagery aspects and/or sound and/or other related data aspects being defined in part, but not exclusively, by exemplary parameters such as focal length, aperture (f-stop being one parameter for denoting aperture), t-stop, shutter speed, sensor sensitivity (such as film sensitivity (e.g., film speed) and/or digital sensor sensitivity), exposure (which may be varied by varying, e.g., shutter speed and/or aperture), frequency and/or wavelength, focus, depth of field, white balance (and/or white point, color temperature, and/or micro reciprocal degree or "mired"), signal/noise ratio, an identified voice of a person or machine, and/or flash (sound aspects are described elsewhere herein). Some or all of the parameters that may define at least in part imagery and/or sounds and/or other related data aspects may have further defining parameters. For example, a frequency and/or wavelength parameter may be associated with one or more bandwidth parameters; and a flash parameter may be associated with one or more parameters for, e.g., duration, intensity, and/or special distribution. Note that although certain examples herein discuss bracketing and/or imagery aspects and/or exemplary parameters in the context of more or less "still" images for sake of clarity, techniques described herein are also applicable to streams of images, such as would typically be produced by digital video cameras 102/106 and thus the use of such, and other, exemplary terms herein are meant to encompass both still and video bracketing/aspects/parameters/etc. unless context dictates otherwise. For instance, the bracketing might include bracketing over, say, 20 frames of video.

Each of the exemplary sensors may detect and/or record and/or transmit one or more imagery aspects and/or sound aspects and/or other related data aspects of an exemplary object at more than one setting of each of the available parameters, thereby bracketing the exemplary object. Generally, "bracketing" includes the imagery technique of making several images of the same object or objects using different settings, typically with a single imagery device such as digital video camera 106. For example, the digital video camera 106 may detect and/or record and/or transmit a series of imagery aspects of the cube 122 at a number of different f-stops; before, after, partially simultaneously with, and/or simultaneously with that series of imagery aspects, another digital video camera 106 and/or another type of sensor, such as sensor 114 may detect and/or record and/or transmit a series of imagery aspects of the sphere 120 and of the cube 122 at a number of different white balances. The processor 126 and/or the processing logic 128 may then accept, via the network 124 or directly, data representing the imagery aspects detected and/or recorded and/or transmitted by the digital video cameras 102 and 106 or by the digital video camera 106 and the sensor 114. The processor 126 and/or the processing logic 128 may then combine at least a portion of the data from one of the sensors with at least a portion of the data from the other sensor, e.g., comparing the data from the two sensors. For example, deriving an identity of color and orientation from the bracketing imagery aspect data of two cubes 122 from digital video camera 106 and sensor 114.

Exemplary digital video cameras 102 and/or 106 may also be capable of detecting and/or recording and/or transmitting video/audio input as one or more data streams representing the video/audio information. Exemplary users 104 and/or 110 and/or another person and/or entity such as user 130 may provide input to the digital video camera 102 and/or the processor 126 and/or the processing logic 128 to select at least a portion of a data stream representing the video/audio information for retention at high resolution (where retention at high resolution is as described herein), e.g., imagery such as an image of a particular object and/or an audio aspect such as an instance of a particular voice and/or an instance of a particular sound. With respect to this example, digital video cameras 102 and/or 106 are representative of any sensor or sensor suite capable of detecting and/or recording and/or transmitting video/audio input as one or more data streams representing the video/audio information.

In the exemplary environment 131, users 132, 134, and 136 may be participants in a teleconference conducted using voice-over-internet-protocol ("VoIP") technology, such as that provided by such commercial concerns as Vonage® and Skype™. User 130 uses device 138, which may include a computer, a telephone equipped for VoIP communication such as an analog telephone adaptor, an IP phone, or some other item of VoIP-enabling hardware/software/firmware, to conduct a conversation by audio means with users 134 and 136 using device 140, which also may include a computer, a telephone equipped for VoIP communication such as an analog telephone adaptor, an IP phone, or some other item of VoIP-enabling hardware/software/firmware. The devices 138 and 140 are representative of any number of such devices that may be used to conduct a VoIP teleconference including any number of participating parties. Because VoIP uses packet switching, packets conveying audio data travel between the device 138 and the device 140 by different route over the network 124 to be assembled in the proper order at their destinations. During a conversation in this exemplary environment, an audio data stream may be formed as packets are created and/or transmitted at a source device, either the device 138 or the device 140, and this audio data stream is reassembled at the destination device. Audio data streams may be formed and reassembled at the devices 138 and 140 simultaneously. Multiple audio data streams representing different speakers or other distinct audio information sources may be generated and reassembled by the devices 138 and/or 140 during a VoIP teleconference.

Where VoIP technology is being used in conjunction with users using standard telephone equipment connected to the Public Switched Telephone Network ("PSTN"), packets created by VoIP equipment such as the device 138 and/or 140 are conveyed over the network 124, reassembled by a device analogous to the devices 138 and/or 140, and transmitted to the standard telephone user over the PSTN.

An exemplary embodiment may include accepting input for a designation of a reference designator in an audio data stream created at the device 138 and/or the device 140, accepting input for a designation of a beginning demarcation designator an audio data stream created at the device 138 and/or the device 140, accepting input for a designation of an ending demarcation designator an audio data stream created at the device 138 and/or the device 140, accepting input for retaining at high resolution, e.g., storing at high resolution in computer memory, audio data from the audio data stream beginning substantially at the beginning demarcation designator and ending substantially at the ending demarcation designator, and retaining at a high resolution such audio data. These operations may be performed by, for example the processor 126 and/or the processing logic 128, which may be incorporated with the device 138 and/or 140, partially incorporated with the device 138 and/or 140, or separated but operably coupled to the device 138 and/or 140. Each of these operations may be initiated by human action, e.g., the user 130 and/or 132 and/or 134 and/or 136 pressing a button, speaking into a microphone, and/or interacting with graphical user interface features, or they may be initiated by operation of some hardware/software/firmware, e.g., audio processing software such as the processor 126 and/or the processing logic 128, or they may be initiated by some combination of human and automated action, as described elsewhere herein. Each of these operations may be performed as an audio data stream is being created at the device 138 and/or 140, and/or as an audio data stream is being reassembled at the device 138 and/or 140, and/or as an audio data stream stored from a VoIP teleconference is played back or analyzed.

A reference designator may include information such as an identifier that identifies the particular audio data stream of interest and a place in the audio data stream at which the information of interest is present, e.g., a place in the stream at which a particular speaker is speaking, and/or may fall within the audio data stream at such a place. A beginning demarcation designator may include an identifier that identifies the particular audio data stream of interest and an identifier of the first packet of a sequence of packets of interest and/or may fall within the audio data stream. An ending demarcation designator may include an identifier that identifies the particular audio data stream of interest and an identifier of the last packet of a sequence of packets of interest and/or may fall within the audio data stream.

Accepting input for retaining at high resolution a designated aspect of an audio data stream, as described elsewhere herein, may be performed, e.g., by using the devices 138 and/or 140 in addition to the other devices for accepting input described in connection with FIG. 1. Such an input may be initiated by an action by a user 104, 110, 118, 130, 132, 134, 136, e.g., pressing a mouse button and/or speaking into a microphone, or the input may be initiated by operation of some hardware/software/firmware, e.g., audio processing software such as the processor 126 and/or the processing logic 128 and/or devices 138, 140, or it may be initiated by some combination of human and automated action. Retaining at a high resolution a portion of an audio data stream designated for retention at a high resolution, as described elsewhere herein, may be performed, e.g., using memory resources associated with and/or operably coupled to the devices 138 and/or 140 in addition to the other devices for data retention described in connection with FIG. 1.

Accepting input for degradation and/or retaining at a lower resolution a portion of an audio data stream not included in a portion of the audio data stream designated for retention at a high resolution, as described elsewhere herein, may be performed, e.g., by using the devices 138 and/or 140 in addition to the other devices for accepting input described in connection with FIG. 1. Such an input may be initiated by an action by a user 104, 110, 118, 130, 132, 134, 136, e.g., pressing a mouse button and/or speaking into a microphone, or the input may be initiated by operation of some hardware/software/ firmware, e.g., audio processing software such as the processor 126 and/or the processing logic 128 and/or devices 138, 140, or it may be initiated by some combination of human and automated action. Degradation and/or retaining at a lower resolution a portion of an audio data stream not included in a portion of the audio data stream designated for retention at a high resolution, as described elsewhere herein, may be performed, e.g., using memory resources associated with and/or operably coupled to the devices 138 and/or 140 in addition to the other devices for data retention described in connection with FIG. 1.

Those skilled in the art will appreciate that the explicitly described examples involving the exemplary sensors (the digital video camera 102, the digital video camera 106, the digital still camera 108, and the sensor suite 112 including sensor 114 and sensor 116), the exemplary devices (138 and 140) the exemplary users (users 104, 110, 118, 130, 132, 134, and 136), the exemplary objects (the sphere 120 and the cube 122), the network 124, the exemplary processor 126, and the exemplary processing logic 128 constitute only a few of the aspects illustrated by FIG. 1.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
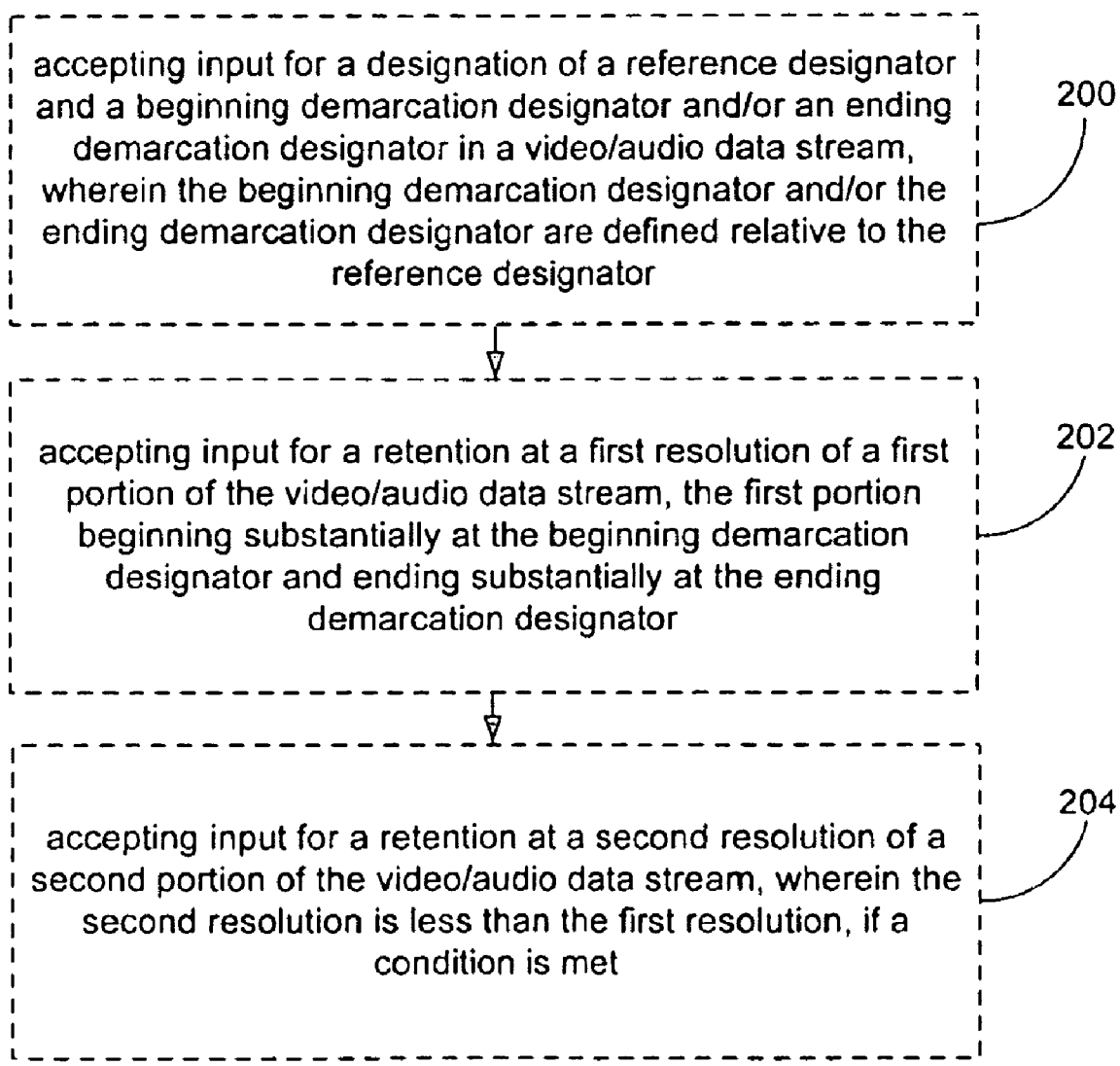
FIG. 2 depicts a high-level logic flowchart of an operational process.

FIG. 2 depicts a high-level logic flowchart of an operational process. The illustrated process may include operations 200, 202, and/or 204. Those skilled in the art will note that operations 200-204 are indicated by dashed lines, which, in general, is indicative of the fact that such steps are typically to be considered optional, and this is generally true throughout this disclosure with respect to described operations. That is, different implementations will typically employ one or more herein-described operations dependent upon context, and the selection of the appropriate operation(s) appropriate to the various context(s) is within the skill of one in the art in light of the teachings herein.

Operation 200 shows accepting input for a designation of a reference designator and a beginning demarcation designator and/or an ending demarcation designator in a video/audio data stream, wherein the beginning demarcation designator and/or the ending demarcation designator are defined relative to the reference designator. Operation 200 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, for designation of a reference designator in a video/audio data stream marking a place in the video/audio data stream at which one or more voices and/or sounds of interest, such as the voice of a particular person or the noise generated by a particular device such as an auto engine, occur in the video/audio data stream. Such an input may be initiated by an action by a user 104/110/118/130/132/134/136, e.g., pressing a mouse button and/or speaking into a microphone, or the input may be initiated by operation of some hardware/software/firmware, e.g., audio processing software such as the processor 126 and/or the processing logic 128 and/or devices 138/140, or it may be initiated by some combination of human and automated action.

Further, operation 200 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, for designation of a place demarcating the beginning of a portion of a video/audio data stream of interest, such as the beginning of a recorded voice and/or a sound designated by a reference designator. Operation 200 may include, for example, accepting input specifying a time index and/or other functionally-related index (in light of the teachings herein) in a near-real-time and/or recorded video/audio data stream or a packet in a VoIP audio data stream. Such an input may be initiated by an action by a user 104/110/118/130/132/134/136, e.g., pressing a mouse button and/or speaking into a microphone, or the input may be initiated by operation of some hardware/software/firmware, e.g., audio processing software such as the processor 126 and/or the processing logic 128 and/or devices 138/140, or it may be initiated by some combination of human and automated action.

In addition, operation 200 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, for designation of a place demarcating the ending of a portion of a video/audio data stream of interest, such as the ending of a recorded voice and/or a sound designated by a reference designator located at some place in the stream during the occurrence of the recorded voice. Operation 200 may include, for example, accepting input specifying a time index and/or other functionally-related index (in light of the teachings herein) in a near-real-time and/or recorded video/audio data stream or a packet in a VoIP video/audio data stream. Such an input may include an automated time-out provided by hardware/software/firmware such as the processor 126 and/or the processing logic 128 and/or devices 138/140, or it may be initiated by some combination of human and automated action.

An input, the accepting of which may be included in operation 200, may be initiated by an action by a user 104/110/118/130/132/134/136, e.g., pressing a mouse button and/or speaking into a microphone (or by other user actions including but not limited to user actions described elsewhere herein), or the input may be initiated by operation of some hardware/software/firmware, e.g., audio processing software such as the processor 126 and/or the processing logic 128 and/or devices 138/140, or it may be initiated by some combination of human and automated action. Such an input may include a automated time-out provided by such hardware/software/firmware.

Operation 202 illustrates accepting input for a retention at a first resolution of a first portion of the video/audio data stream, the first portion beginning substantially at the beginning demarcation designator and ending substantially at the ending demarcation designator. Operation 202 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, for retention of a portion of interest of a video/audio data stream at relatively high resolution relative to retention of another portion of the video/audio data stream, such as 96 kB/second compared to 12 kB/second, where the portion of interest is identified by a reference designator located at some place in the stream during the occurrence of the recorded voice, a beginning demarcation designator, and an ending demarcation designator. Such an input may include but is not limited to a high resolution value, for example, 96 kB/second. Such an input may include but is not limited to, for instance, a frequency spectrum characteristic such as a lower and/or an upper cut-off frequency defining frequencies to be included in a retained portion of a video/audio data stream, and/or an intensity characteristic such as a lower and/or an upper cut-off intensity defining intensities to be included in a retained portion of a video/audio data stream. Such a video/audio data stream may be, for example, a play-back of a recorded and/or stored video/audio data stream or a live video/audio data stream being created and/or transmitted and/or received and/or reassembled during, for instance, a VoIP teleconference. An input, the accepting of which may be included in operation 202, may be initiated by an action by a user 104/110/118/130/132/134/136, e.g., pressing a mouse button and/or speaking into a microphone (or by other user actions including but not limited to user actions described elsewhere herein), or the input may be initiated by operation of some hardware/software/firmware, e.g., audio processing software such as the processor 126 and/or the processing logic 128 and/or devices 138/140, or it may be initiated by some combination of human and automated action. Such an input may be initiated by an action by a user 104/110/118/130/132/134/136, e.g., pressing a mouse button and/or speaking into a microphone, or the input may be initiated by operation of some hardware/software/firmware, e.g., audio processing software such as the processor 126 and/or the processing logic 128 and/or devices 138/140, or it may be initiated by some combination of human and automated action. Operation 202 may include but is not limited to accepting tactile input, sonic input, and/or visual input as described herein.

Operation 204 depicts accepting input for a retention at a second resolution of a second portion of the video/audio data stream, wherein the second resolution is less than the first resolution, if a condition is met. For example, operation 204 may include accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, for retention of a portion of a video/audio data stream at relatively low resolution relative to retention of another portion of the video/audio data stream, such as 12 kB/second compared to 96 kB/second. A portion or portions to be retained at a relatively low resolution, compared to a higher resolution at which a portion is to be retained, may in some cases be defined as the portion of a video/audio data stream that is not included in the portion to be retained at the higher resolution. An input, the accepting of which may be included in operation 204, may be initiated by an action by a user 104/110/118/130/132/134/136, e.g., pressing a mouse button and/or speaking into a microphone (or by other user actions including but not limited to user actions described elsewhere herein), or the input may be initiated by operation of some hardware/software/firmware, e.g., audio processing software such as the processor 126 and/or the processing logic 128 and/or devices 138/140, or it may be initiated by some combination of human and automated action.

Figure 3A:
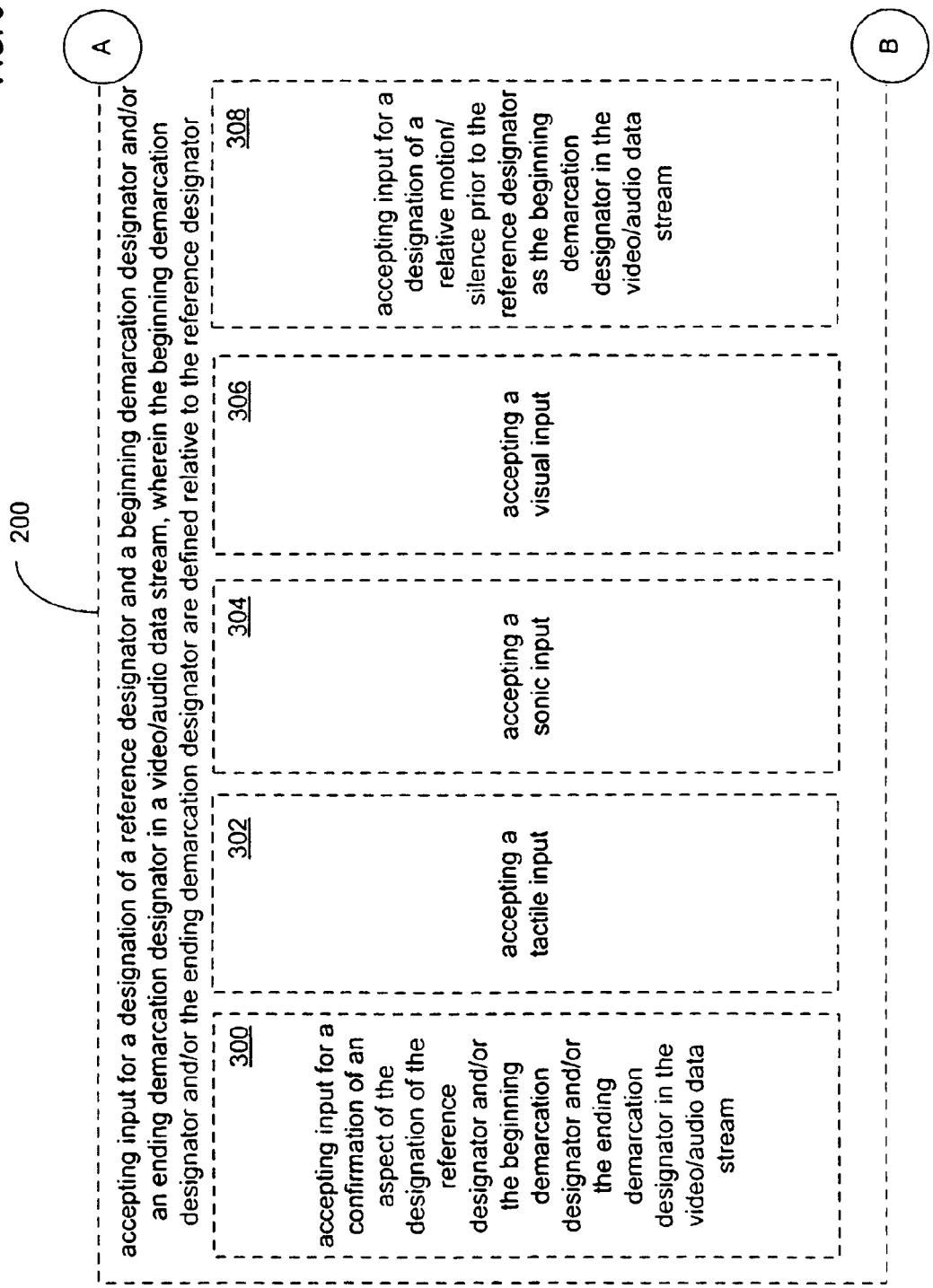
FIG. 3 shows several alternative implementations of the high-level logic flowchart of FIG. 2.

FIG. 3 shows several alternative implementations of the high-level logic flowchart of FIG. 2. Operation 200—accepting input for a designation of a reference designator and a beginning demarcation designator and/or an ending demarcation designator in a video/audio data stream, wherein the beginning demarcation designator and/or the ending demarcation designator are defined relative to the reference designator—may include one or more of the following operations: 300, 302, 304, 306, 308, 310, 312, 314, 316, and/or 318.

Operation 300 illustrates accepting input for a confirmation of an aspect of the designation of the reference designator and/or the beginning demarcation designator and/or the ending demarcation designator in the video/audio data stream. Operation 300 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, signifying a confirmation by a user 104/110/118/130/132/134/136 and/or by an automated operation of the processor 126 and/or the processing logic 128 of a previous input for designation of a reference designator in a video/audio data stream, where the reference designator designates a place within a recorded sound of interest occurring within an video/audio data stream. Such confirmation may include, for instance, an affirmative reply by a user 104/110/118/130/132/134/136 to a query as to whether a displayed designation is desired. In addition, operation 300 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, signifying confirmation by user 104/110/118/130/132/134/136 and/or by an automated operation of the processor 126 and/or the processing logic 128 of a previous input for designation of a beginning demarcation designator in a video/audio data stream, where the beginning demarcation designator is before a reference designator in the stream. Such confirmation may include, for example, an automated check by the processor 126 and/or the processing logic 128 of the previous input for designation of the beginning demarcation designator.

Further, operation 300 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, signifying confirmation by the user 104/110/118/130/132/134/136 and/or by an automated operation of the processor 126 and/or the processing logic 128 of a previous input for designation of an ending demarcation designator in a video/audio data stream, where the ending demarcation designator is after a beginning demarcation designator in the stream. Such confirmation may include, for example, an affirmative response by the user 104/110/118/130/132/134/136 in response to a query as to whether the previous input for designation of the ending demarcation designator is desired.

Operation 302 shows accepting a tactile input (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 mechanically manipulating an interface device and/or feature, such as a mouse input device and/or a drop-down menu of a graphical user interface).

Operation 304 shows accepting a sonic input (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 speaking and/or generating some sonic signal such as a click or a whistle into an interface device such as a microphone, or where the input is initiated by an automated operation of the processor 126 and/or the processing logic 128 playing back a recording of such a sonic signal).

Operation 306 depicts accepting a visual input (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 interacting with a video input device such as a camera and/or a light/infrared sensor and/or a visual component of a graphical user interface, or where the input is initiated by an automated operation of the processor 126 and/or the processing logic 128 playing back a recording of a visual signal or of an interaction with a graphical user interface).

Operation 308 depicts accepting input for a designation of a relative motion/silence prior to the reference designator as the beginning demarcation designator in the video/audio data stream (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, signifying as a beginning demarcation designator the end of a relative motion and/or silence just before an image and/or a voice of interest, where the image and/or voice of interest is designated by a reference designator in the image and/or the voice in the stream; thus, operation 308 may include signifying as a beginning demarcation designator the end of a relative motion just before a voice of interest, and/or the end of a relative silence just before an image of interest, as well as signifying as a beginning demarcation designator the end of a relative motion just before an image of interest, and/or the end of a relative silence just before a voice of interest, etc.). In addition to the foregoing, and as an aside, those skilled in the art will appreciate that, in general, the examples herein may be viewed as representative of use of audio, video, or other recordable data, and/or substantially any combination thereof, unless context indicates otherwise.

Operation 310 illustrates accepting input of a designation of a beginning designator of an image/sound at the reference designator as the beginning demarcation designator in the video/audio data stream (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, signifying as a beginning demarcation designator the beginning of an image and/or a sound of interest such as a new person as determined by a face recognition program by a human viewer and/or a new voice as determined by a voice recognition program or by a human listener, where the image and/or the sound of interest is designated by a reference designator in the image/sound in the stream).

Operation 312 shows accepting input of a designation of an ending designator of a latest image/sound prior to the reference designator as the beginning demarcation designator in the video/audio data stream (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, signifying as a beginning demarcation designator the end of an image and/or a sound just before an image and/or a sound of interest, where the image and/or the sound of interest is designated by a reference designator in the image and/or the sound of interest in the stream; thus, operation 312 may include signifying as a beginning demarcation designator the end of an image just before a sound of interest, and/or the end of a sound just before an image of interest, as well as signifying as a beginning demarcation designator the end of a sound just before a sound of interest, and/or the end of an image just before an image of interest, etc.).

Operation 314 depicts accepting input for a designation of an ending designator of an image/sound at the reference designator as the ending demarcation designator in the video/audio data stream (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 via interaction with, for instance, a keyboard and/or a radio button of a graphical user interface, and/or by an automated operation of the processor 126 and/or of the processing logic 128, signifying as an ending demarcation designator the end of an image and/or a voice and/or of a sound of interest in the video/audio data stream, where the image/voice/sound of interest is designated by a reference designator in the image/voice/sound in the stream).

Operation 316 shows accepting input of a designation of a relative motion/silence after an image/sound at the reference designator as the ending demarcation designator in the video/audio data stream (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 via interaction with, for instance, a microphone and/or a camera, and/or by an automated operation of the processor 126 and/or of the processing logic 128, signifying as an ending demarcation designator the beginning of a relative motion and/or a silence just after an image and/or a voice and/or a sound of interest in the video/audio data stream, where the image/voice/sound of interest is designated by a reference designator in the image/voice/sound in the stream; thus, operation 316 may include signifying as an ending demarcation designator the beginning of a relative motion just after a voice and/or a sound of interest, and/or the beginning of a relative silence just after an image of interest, as well as signifying as an ending demarcation designator the beginning of a relative motion just after an image of interest, and/or the beginning of a relative silence just after a voice and/or a sound of interest, etc.).

Operation 318 shows accepting input of a designation of a relative motion/silence after an image/sound at the reference designator as the ending demarcation designator in the video/audio data stream (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 via interaction with, for instance, a microphone and/or a camera, and/or by an automated operation of the processor 126 and/or of the processing logic 128, signifying as an ending demarcation designator the end of a relative motion and/or silence just after an image and/or a voice and/or a sound of interest in the video/audio data stream, where the image/voice/sound of interest is designated by a reference designator in the image/voice/sound in the stream; thus, operation 318 may include signifying as an ending demarcation designator the end of a relative motion just after a voice and/or a sound of interest, and/or the end of a relative silence just after an image of interest, as well as signifying as an ending demarcation designator the end of a relative motion just after an image of interest, and/or the end of a relative silence just after a voice and/or a sound of interest).

FIG. 4 shows several alternative implementations of the high-level logic flowchart of FIG. 3. Operation 302—accepting a tactile input—may include one or more of the following operations: 400, 402, and/or 404.

Operation 400 depicts accepting the tactile input introduced via a pressing of a button (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 mechanically manipulating a button on a mouse input device).

Operation 402 illustrates accepting the tactile input introduced via a pressing of a keyboard key (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/ 118/130/132/134/136 mechanically manipulating a computer keyboard key).

Operation 404 shows accepting the tactile input introduced via an interaction with a graphical user interface feature (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 interacting with a button included in a graphical user interface).

Figure 5:
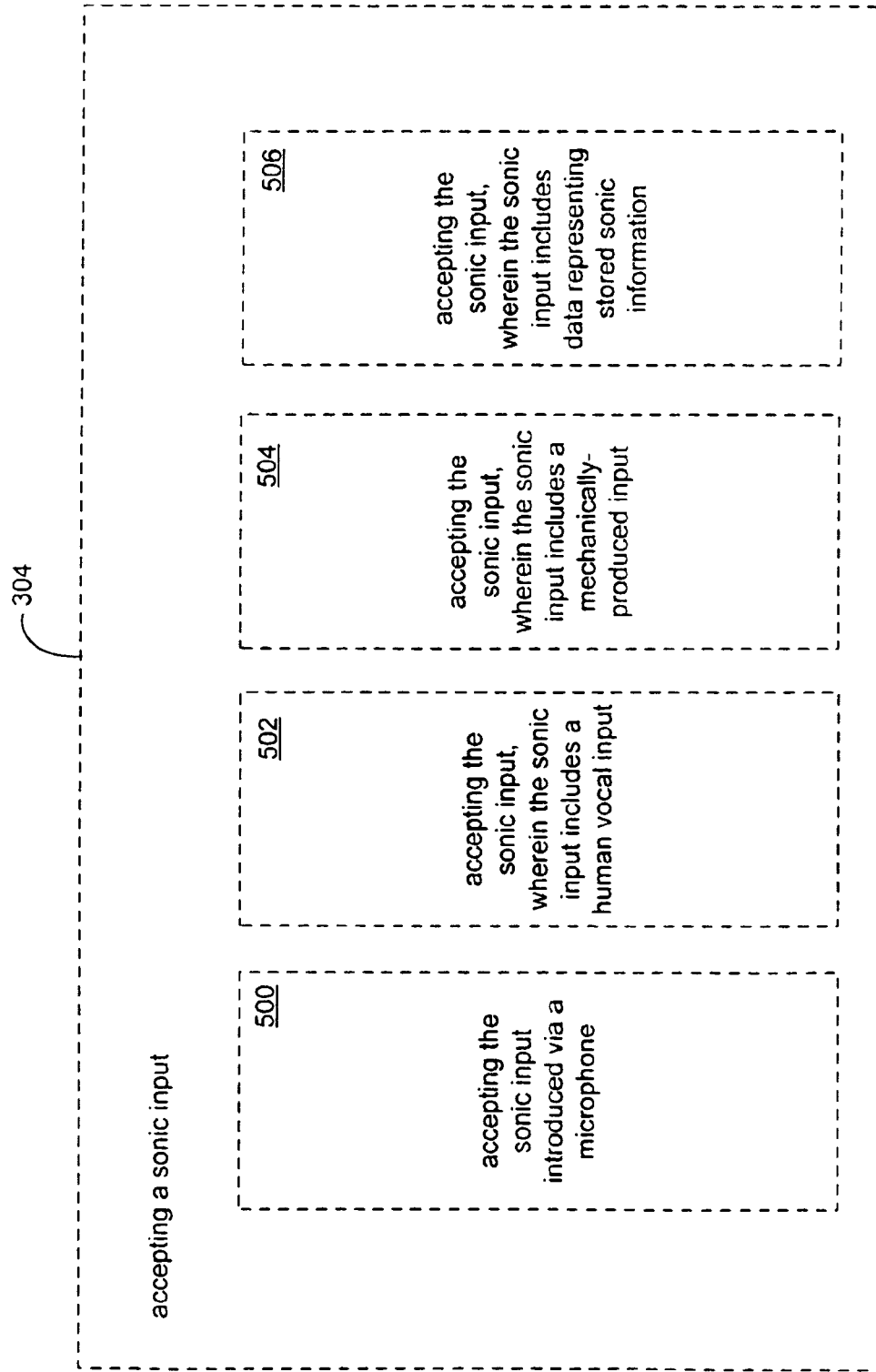
FIG. 5 illustrates several alternative implementations of the high-level logic flowchart of FIG. 3.

FIG. 5 illustrates several alternative implementations of the high-level logic flowchart of FIG. 3. Operation 304—accepting a sonic input—may include one or more of the following operations: 500, 502, 504 and/or 506.

Operation 500 depicts accepting the sonic input introduced via a microphone (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 causing a sound to be made that is detected by a microphone).

Operation 502 shows accepting the sonic input, wherein the sonic input includes a human vocal input (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 speaking into a microphone).

Operation 504 depicts accepting the sonic input, wherein the sonic input includes a mechanically-produced input (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 causing a sound to be made mechanically by a speaker).

Operation 506 illustrates accepting the sonic input, wherein the sonic input includes data representing stored sonic information (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 playing back a recording of someone speaking into a microphone). As yet one more specific example, at a press conference, a chime might go off to indicate that conference is beginning and that cameras in the vicinity should thus be recording on high.

FIG. 6 depicts several alternative implementations of the high-level logic flowchart of FIG. 3. Operation 306—accepting a visual input—may include one or more of the following operations: 600, 602, and/or 604.

Operation 600 shows accepting the visual input introduced via an interaction with a graphical user interface feature (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 interacting with a button in a visual presentation of a graphical user interface, or where the input is initiated by an automated operation of the processor 126 and/or the processing logic 128 playing back a recording of an interaction with a graphical user interface).

Operation 602 depicts accepting the visual input introduced via an electromagnetic-radiation detection device (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 causing a light flash that is detected by a camera, or where the input is initiated by an automated operation of the processor 126 and/or the processing logic 128 playing back a recording of such a visual signal). It should be understood that visual input is not limited to the visual spectrum of a human, but also may include virtually any portion of the electromagnetic spectrum that a machine and/or an apparatus is capable of detecting. It should also be understood that examples of visual input may include but are not limited to gestural input, detection of captured electromagnetic spectrum data indicative of a motion of a capturing device (e.g., such as might be detected if a camera were moved in a predefined way). It should also be understood that a sign may include but is not limited to a static sign (e.g., holding up a victory sign with two fingers and/or holding up a printed sign that says "now"), and/or a dynamic sign (e.g., something like clapping or waving).

Operation 604 shows accepting the visual input, wherein the visual input includes data representing stored visual information (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, where the input is initiated by a user 104/110/118/130/132/134/136 making a sign that is detected by a camera or by a user 104/110/118/ 130/132/134/136 playing back a video recording of a making a sign that is detected by a camera).

FIG. 7 depicts several alternative implementations of the high-level logic flowchart of FIG. 2. Operation 202—accepting input for a retention at a first resolution of a first portion of the video/audio data stream, the first portion beginning substantially at the beginning demarcation designator and ending substantially at the ending demarcation designator—may include one or more of the following operations: 700, 702, 704, 706, 708, 710, 712, and/or 714.

Operation 700 illustrates accepting input for a designation of audio data for inclusion in the first portion of the video/ audio data stream. Operation 700, for example, may include, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, for designation for inclusion of audio of a specified seven-second portion of a video/audio data stream in a portion of the stream to be retained at a relatively high resolution.

Operation 702 depicts accepting input for a designation of video data for inclusion in the first portion of the video/audio data stream. Operation 702, for example, may include, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, for designation of inclusion of video of a specified one-minute portion of a video/audio stream in a portion of the stream to be retained at a relatively high resolution.

Operation 704 shows accepting input for a designation of a first portion of a live and/or a substantially live video/audio data stream for the retention at the first resolution. Operation 704, for example, may include, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, for designation of a specified two-minute portion of a video/audio data stream from the digital video camera 106 for retention in data storage to reproduce the original video and/or audio at relatively high resolution, where the video/audio data stream is originating from the digital video camera 106 as, or substantially as (e.g., with a minimal delay), the data is being detected and/or recorded and/or transmitted.

Operation 706 illustrates accepting input for a designation of a first portion of a retained video/audio data stream for the retention at the first resolution. Operation 704, for example, may include, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, for designation of a specified ten second portion of a video/audio data stream from the digital video camera 106 for retention in data storage to reproduce the original video and/or audio at relatively high resolution, where the video/audio data stream is originating from the digital video camera 106 as, or substantially as, the data is being played backed from data storage.

Operation 708 depicts accepting an input for a confirmation of an aspect of the input for the retention at the first resolution of the first portion of the video/audio data stream (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, from a user 104/110/118/130/132/134/136 signifying confirmation of a prior input for retention at a first resolution of a portion of a video/audio data stream).

Operation 710 shows accepting an input for a designation of a first resolution value (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, from a user 104/110/118/130/132/134/136 for designation of a particular resolution value for retention of a portion of a video/audio data stream, such as 96 kB/second).

Operation 712 shows accepting an input for a designation of a first frequency spectrum characteristic (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, from a user 104/110/118/130/132/134/136 for designation of a characteristic of a frequency spectrum of a particular human voice of interest).

Operation 714 illustrates accepting an input for a designation of a first frequency range characteristic (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, from a user 104/110/118/130/132/134/136 for designation of a particular lower frequency cutoff for retention of a portion of a video/audio data stream, such as 800 Hz).

FIG. 8 illustrates several alternative implementations of the high-level logic flowchart of FIG. 2. Operation 204—accepting input for a retention at a second resolution of a second portion of the video/audio data stream, wherein the second resolution is less than the first resolution, if a condition is met—may include one or more of the following operations: 800, 802, 804, 806, 808, 810, 812, 814, 816, 818, 820, 822, 824, 826, 828, 830, 832, 834, 836, and/or 838.

Operation 800 depicts accepting an input for a confirmation of an aspect of the input for the retention at the second resolution of the second portion of the video/audio data stream. Operation 800 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, from a user 104/110/118/130/132/134/136 signifying confirmation of an aspect of prior input for retention at a second resolution of a portion of a video/audio data stream, such as an input for a second resolution value.

Operation 802 depicts accepting a tactile input (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, initiated by a user 104/110/118/130/132/134/136 interacting mechanically with an input device such as a mouse and/or a keyboard, such as mechanically manipulating a button on a mouse input device, mechanically manipulating a computer keyboard key, mechanically manipulating a button on a touchpad/button device, mechanically manipulating a personal digital assistant keyboard key, and/or interacting with a drop-down and/or a radio button menu included in a graphical user interface).

Operation 804 illustrates accepting a sonic input (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, initiated by a user 104/110/118/130/132/134/136 interacting with a microphone, such as causing a sound to be made that is detectable by a microphone, e.g., speaking a word or a distinctive sound into a microphone, causing a sound to be made mechanically by a buzzer, playing back a recording of someone speaking into a microphone, and/or performing an automated operation of the processor 126 and/or the processing logic 128 playing back a recording of such a sonic signal).

Operation 806 shows accepting a visual input (e.g., accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, initiated by a user 104/110/118/130/132/134/136 interacting with an image detection device such as a light sensor, and/or interacting with a button and/or a control panel in a visual presentation of a graphical user interface, and/or making a sign that is detected by a camera, and/or playing back a recording of a light flash that is detected by a light sensor, and/or performing an automated operation of the processor 126 and/or the processing logic 128 playing back a recording of such a visual signal).

Operation 808 shows accepting input for the retention at the second resolution of the second portion of the video/audio data stream, wherein the second resolution is determined as a function of a temporal distance in the video/audio data stream between at least a part of the first portion of the video/audio data stream and at least a part of the second portion of the video/audio data stream. Operation 808 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, to retain at a low resolution a portion of a video/audio data stream that is between one minute and two minutes from a portion of the video/audio data stream to be retained at high resolution.

Operation 810 illustrates accepting input for the retention at the second resolution of the second portion of the video/audio data stream, wherein the retention at the second resolution is to be performed if a preselected time has elapsed after a specified previous retention of the second portion of the video/audio data stream. Operation 810, for example, may include, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, to retain a portion of a video/audio data stream at a relatively low resolution one week after that portion was stored for the first time by a particular user, e.g., user 104.

Operation 812 shows accepting input for the retention at the second resolution of the second portion of the video/audio data stream, wherein the retention at the second resolution is to be performed if a time value is framed by a preselected time window. Operation 812 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, to retain a portion of a video/audio data stream at a relatively low resolution when the time between an initial review of the portion by a user, e.g. user 110, and the present time is framed by, e.g., included within, a preselected time window of one month to six months prior to the present time.

Operation 814 depicts accepting input for the retention at the second resolution of the second portion of the video/audio data stream, wherein the retention of the second portion of the video/audio data stream at the second resolution is to be performed if at least one of an available storage space is less than a preselected amount, a condition established by a user is met, and/or a criterion corresponding to a storage management algorithm is met. Operation 814 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, to retain a portion of a video/audio data stream at a relatively low resolution if an available storage space is less than 50 MB and/or a condition established by user 104, such as the passage of one month from a previous access of the portion, is met, and/or a storage management algorithm criterion, such as no increase in a combined available storage space of across five storage devices in a month, are met.

Operation 816 shows accepting input for the retention at the second resolution of the second portion of the video/audio data stream if a condition responsive to an examination of at least one other retained set of video and/or audio data is met. Operation 816, for example, may include accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, to retain a portion of a video/audio data stream at a relatively low resolution if, upon examination, it is found that another retained set of video/audio data contains information that decreases the usefulness of a high-resolution retention of the portion under consideration for retention at low resolution, such as a finding that a first surveillance record of a location does not include any video/audio record of a particular person in a second surveillance record that includes that person, so that there is no interest in retaining the second surveillance record at high resolution, indicating that the second record may be retained at a relatively low resolution.

Operation 818 illustrates accepting input for the retention at the second resolution of the second portion of the video/audio data stream, wherein the retention of the second portion of the video/audio data stream at the second resolution is to be performed if a condition is met, wherein the condition is related to one or more of a set of events and/or conditions excluding a specified previous retention of the second portion of the video/audio data stream. Operation 818, for example, may include accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, to retain at a relatively low resolution a portion of a video/audio data stream if that portion of the video/audio data stream has not been designated for retention at a relatively high resolution.

Operation 820 shows accepting input for the retention at the second resolution of the second portion of the video/audio data stream, wherein the retention of the second portion of the video/audio data stream at the second resolution is to be performed if a condition responsive to data received from a device other than a device used for a specified previous retention of the second portion of the video/audio data stream is met. Operation 820 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, to retain a portion of a video/audio data stream at a relatively low resolution if a storage medium device that was not used for a specified previous retention of the portion provides an indication that it has less than a particular amount of available storage capacity.

Operation 822 depicts accepting input for the retention at the second resolution of the second portion of the video/audio data stream, wherein the retention of the second portion of the video/audio data stream at the second resolution is to be performed if a condition responsive to data received from a device other than a device to be used for the retention of the second portion of the video/audio data stream at the second resolution is met. Operation 822 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, to retain a portion of a video/audio data stream at a relatively low resolution if a storage medium that is not to be used for retention of the portion at the low resolution provides an indication that information stored on it does not specify a requirement that the portion be retained at a high resolution, such as an indication from a storage medium not to be used for retention of the portion at a low resolution that a particular vehicle is of interest to a user, e.g., user 118, when video/audio information regarding that vehicle is not included in the portion.

Operation 824 shows accepting input for the retention at the second resolution of the second portion of the video/audio data stream, wherein the method includes a method implemented in a first device, and wherein the retention of the second portion of the video/audio data stream at the second resolution is to be performed if a condition responsive to data received from a second device is met. Operation 824, for example, may include accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, to retain a portion of a video/audio data stream at a relatively low resolution, where the method related to data management is implemented in the processor 126 and/or the processing logic 128, if the processor 126 and/or the processing logic 128 receive from a back-up storage unit an indication that the storage capacity available in the back-up storage unit is less than a specified capacity.

Operation 826 illustrates accepting input for a designation of audio data for inclusion in the second portion of the video/audio data stream. Operation 826 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, for designation for inclusion of audio of a specified ten-minute portion of a video/audio data stream in a portion of the stream to be retained at a relatively low resolution.

Operation 828 depicts accepting input for a designation of video data for inclusion in the second portion of the video/audio data stream. Operation 828, for example, may include accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, for designation of inclusion of video of a specified ten-second portion of a video/audio data stream in a portion of the stream to be retained at a relatively low resolution.

Operation 830 illustrates accepting input for a designation of a second portion of a live and/or a substantially live video/audio data stream for the retention at the second resolution. Operation 830 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, for designation of a specified two-minute portion of a video/audio data stream from the digital video camera 102 for retention in data storage to reproduce the original video and/or audio at relatively low resolution, where the video/audio data stream is originating from the digital video camera 102 as, or substantially as (e.g., with a minimal delay), the data is being detected and/or recorded and/or transmitted.

Operation 832 shows accepting input for a designation of a second portion of a retained video/audio data stream for the retention at the second resolution. Operation 832 may include, for example accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, for designation of a specified one-minute portion of a video/audio data stream from the digital video camera 106 for retention in data storage to reproduce the original video and/or audio at relatively low resolution, where the video/audio data stream is originating from the digital video camera 106 as, or substantially as, the data is being played backed from data storage.

Operation 834 illustrates accepting an input for a designation of a second resolution value. Operation 834, for example, may include accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, from a user 104/110/118/130/132/134/136 for designation of a particular resolution value for retention of a portion of a video/audio data stream, such as 24 kB/second.

Operation 836 depicts accepting an input for a designation of a second frequency spectrum characteristic. Operation 836, for example, may include accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, from a user 104/110/118/130/132/134/136 for designation of a characteristic of a frequency spectrum of a particular engine noise of interest.

Operation 838 shows accepting an input for a designation of a second frequency range characteristic. Operation 838 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, from a user 104/110/118/130/132/134/136 for designation of a particular upper frequency cutoff for retention of a portion of a video/audio data stream, such as 20 kHz).

Figure 9:
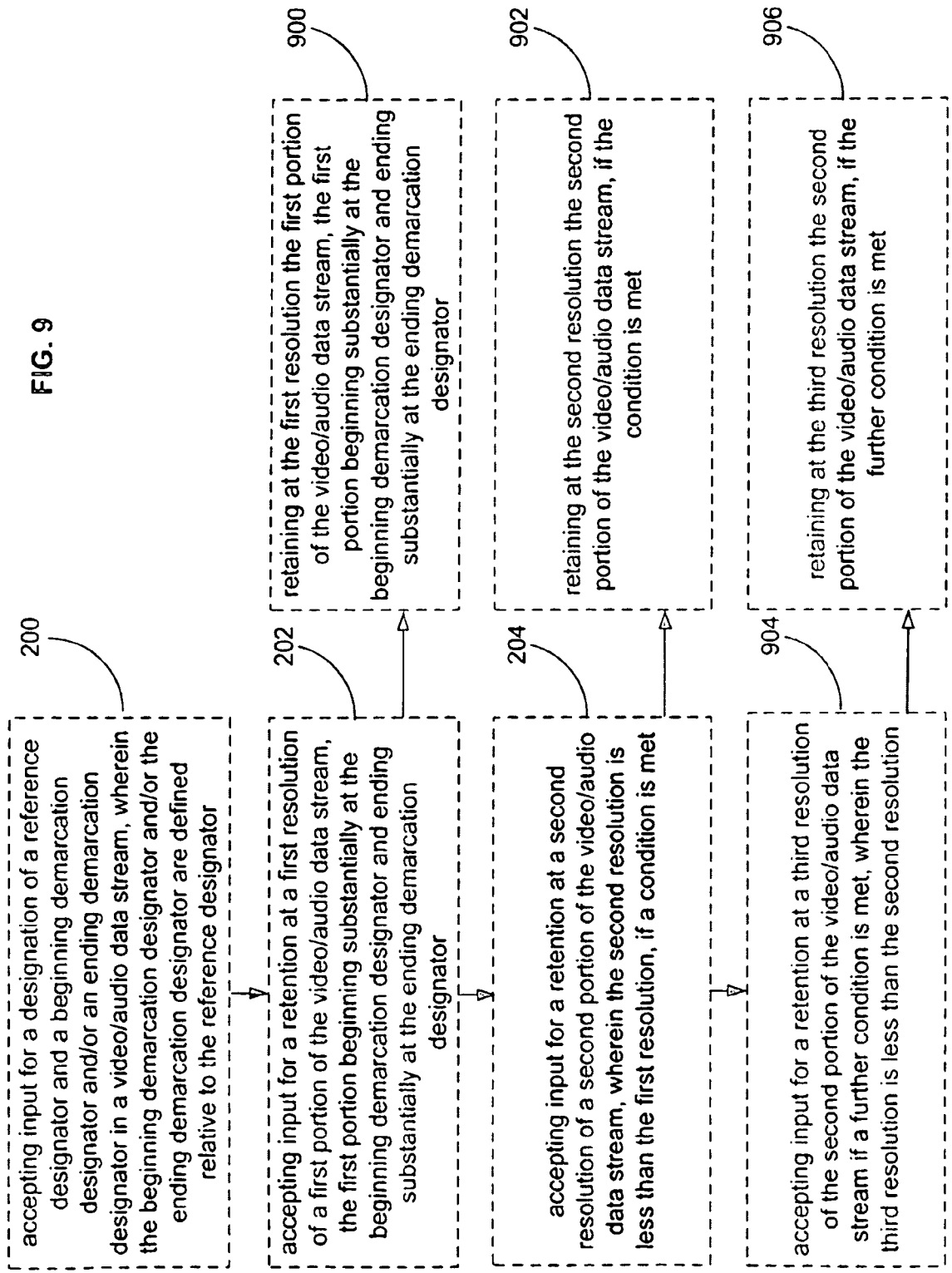
FIG. 9 illustrates a high-level logic flowchart of an operational process.

FIG. 9 illustrates a high-level logic flowchart of an operational process. The illustrated process may include one or more or the following operations: 200 (as described elsewhere herein), 202 (as described elsewhere herein), 204 (described elsewhere herein), 900, 902, 904, and/or 906.

Operation 900 illustrates retaining at the first resolution the first portion of the video/audio data stream, the first portion beginning substantially at the beginning demarcation designator and ending substantially at the ending demarcation designator. Operation 900 may include, for example, retaining, via a processor 126 and/or a processing logic 128 and/or a digital video camera 102 and/or a digital video camera 106 and/or a sensor 114 and/or a sensor 116 and/or a device 138 and/or device 140, at a high resolution a portion of a video/audio data stream relative to retention of another portion of the video/audio data stream, such as 96 kB/second compared to 12 kB/second, where the portion to be retained is identified by a reference designator located at some place in the stream during the occurrence of the recorded voice, a beginning demarcation designator, and an ending demarcation designator. Such a video/audio data stream may be, for example, a play-back of a recorded and/or stored video/audio data stream or a live video/audio data stream being created or reassembled during, for instance, a VoIP teleconference. Such a retaining may be performed via the processor 126 and/or the processing logic 128 and/or the digital video camera 102 and/or the digital video camera 106 and/or the sensor 114 and/or the sensor 116 and/or the device 138 and/or device 140, using memory resources integral to, associated with, and/or operably coupled to those devices.

Operation 902 depicts retaining at the second resolution the second portion of the video/audio data stream, if the condition is met. Operation 902 may include, for example, retaining, via a processor 126 and/or a processing logic 128 and/or a digital video camera 102 and/or a digital video camera 106 and/or a sensor 114 and/or a sensor 116 and/or a device 138 and/or device 140, at a low resolution a portion of a video/audio data stream relative to retention of another portion of the video/audio data stream, such as 12 kB/second compared to 96 kB/second. Such a video/audio data stream may be, for example, a play-back of a recorded and/or stored video/audio data stream or a live video/audio data stream being created or reassembled during, for instance, a VoIP teleconference. Such a retaining may be performed via the processor 126 and/or the processing logic 128 and/or the digital video camera 102 and/or the digital video camera 106 and/or the sensor 114 and/or the sensor 116 and/or the device 138 and/or device 140, using memory resources integral to, associated with, and/or operably coupled to those devices.

Operation 904 shows accepting input for a retention at a third resolution of the second portion of the video/audio data stream if a further condition is met, wherein the third resolution is less than the second resolution. Operation 904 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, initiated by a user 104/110/118/130/132/134/136, for retention, via a processor 126 and/or a processing logic 128 and/or a digital video camera 102 and/or a digital video camera 106 and/or a sensor 114 and/or a sensor 116 and/or a device 138 and/or device 140, at a low resolution a portion of a video/audio data stream relative to at least two retentions of another portion of the video/audio data stream and/or of a previous retention of the same portion of the video/audio data stream, such as 6 kB/second compared to 12 kB/second and 96 kB/second. Such a video/audio data stream may be, for example, a play-back of a recorded and/or stored video/audio data stream or a live video/audio data stream being created or reassembled during, for instance, a VoIP teleconference. Such an input may be initiated by an action by a user 104/110/118/130/132/134/136, e.g., pressing a mouse input device button and/or speaking into a microphone, or the input may be initiated by operation of some hardware/software/firmware, e.g., audio processing software such as the processor 126 and/or the processing logic 128 and/or the device 138/140, or it may be initiated by some combination of human and automated action.

Operation 906 illustrates retaining at the third resolution the second portion of the video/audio data stream, if the further condition is met. Operation 906 may include, for example, retaining, via a processor 126 and/or a processing logic 128 and/or a digital video camera 102 and/or a digital video camera 106 and/or a sensor 114 and/or a sensor 116 and/or a device 138 and/or device 140, at a low resolution a portion of a video/audio data stream relative to at least two retentions of another portion of the video/audio data stream and/or of a previous retention of the same portion of the video/audio data stream, such as 6 kB/second compared to 12 kB/second and 96 kB/second. Such a video/audio data stream may be, for example, a play-back of a recorded and/or stored video/audio data stream or a live video/audio data stream being created or reassembled during, for instance, a VoIP teleconference. Such a retaining may be performed via the processor 126 and/or the processing logic 128 and/or the digital video camera 102 and/or the digital video camera 106 and/or the sensor 114 and/or the sensor 116 and/or the device 138 and/or device 140, using memory resources integral to, associated with, and/or operably coupled to those devices.

Figure 10:
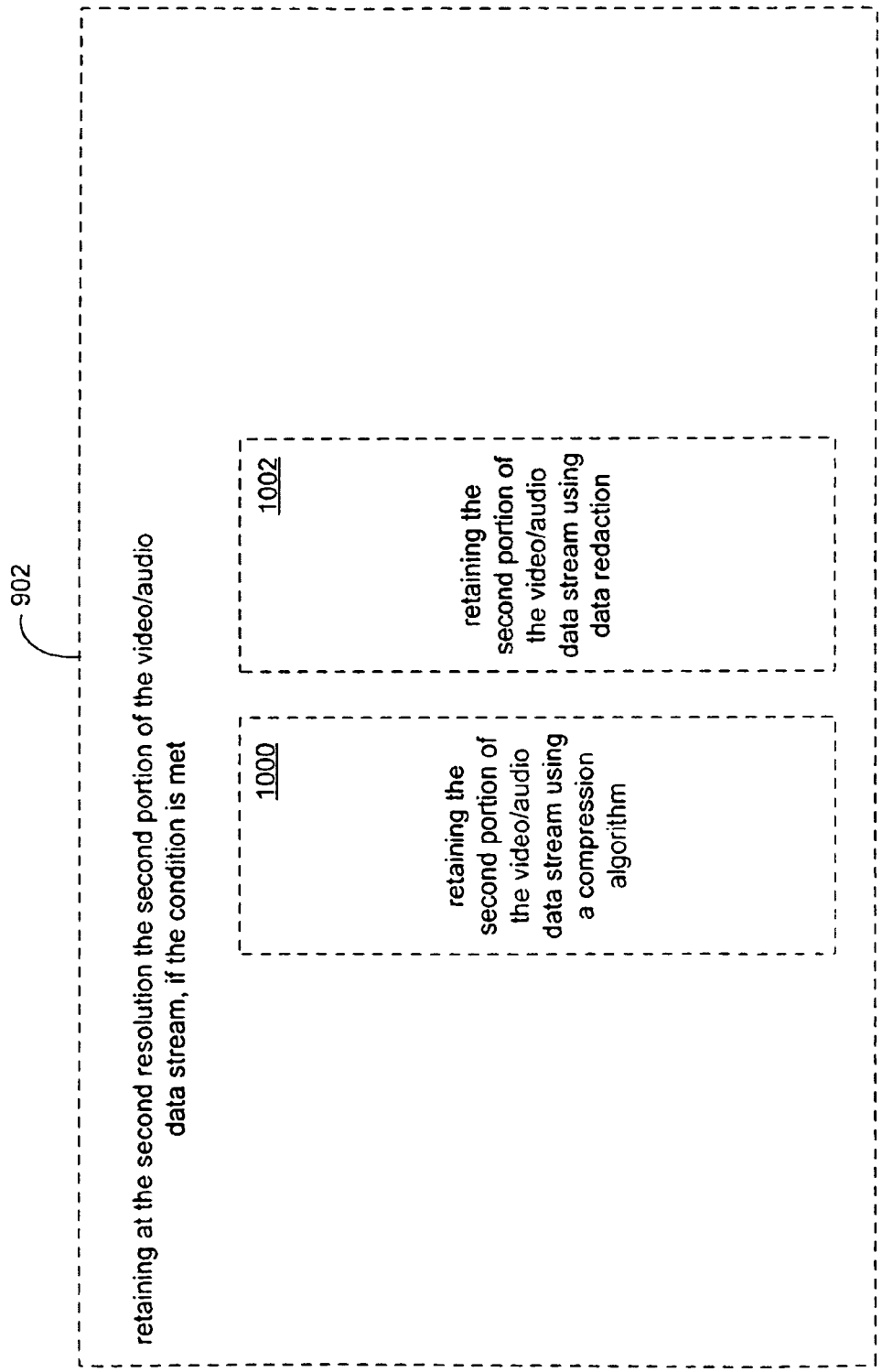
FIG. 10 shows several alternative implementations of the high-level logic flowchart of FIG. 9.

FIG. 10 shows several alternative implementations of the high-level logic flowchart of FIG. 9. Operation 902—retaining at the second resolution the second portion of the video/audio data stream, if the condition is met—may include one or more of the following operations: 1000 and/or 1002.

Operation 1000 shows retaining the second portion of the video/audio data stream using a compression algorithm. Operation 1000, for example, may include retaining, via a processor 126 and/or a processing logic 128 and/or a digital video camera 102 and/or a digital video camera 106 and/or a sensor 114 and/or a sensor 116 and/or a device 138 and/or device 140, at a low resolution a portion of a video/audio data stream relative to retention of another portion of the video/audio data stream, such as 12 kB/second compared to 96 kB/second, where the low resolution is obtained using a compression algorithm, e.g., a lossy compression algorithm, on a portion of the video/audio data stream retained at a relatively high resolution and/or a file representing such a portion. In this example, the compression algorithm may be stored and/or run using the processor 126 and/or the processing logic 128 and/or the digital video camera 102 and/or the digital video camera 106 and/or the sensor 114 and/or the sensor 116 and/or the device 138 and/or device 140 and/or some computational unit operably coupled to one or more of those devices.

Operation 1002 illustrates retaining the second portion of the video/audio data stream using data redaction. Operation 1002 may include, for example, retaining, via a processor 126 and/or a processing logic 128 and/or a digital video camera 102 and/or a digital video camera 106 and/or a sensor 114 and/or a sensor 116 and/or a device 138 and/or device 140, at a low resolution a portion of a video/audio data stream relative to retention of another portion of the video/audio data stream, such as 12 kB/second compared to 96 kB/second, where the low resolution is obtained using data redaction on a portion of the video/audio data stream retained at a relatively high resolution and/or a file representing such a portion to redact data representing the higher and lower frequencies of an audio portion of the high resolution file. In this example, a program for data redaction may be stored and/or run using the processor 126 and/or the processing logic 128 and/or the digital video camera 102 and/or the digital video camera 106 and/or the sensor 114 and/or the sensor 116 and/or the device 138 and/or device 140 and/or some computational unit operably coupled to one or more of those devices.

Figure 11:
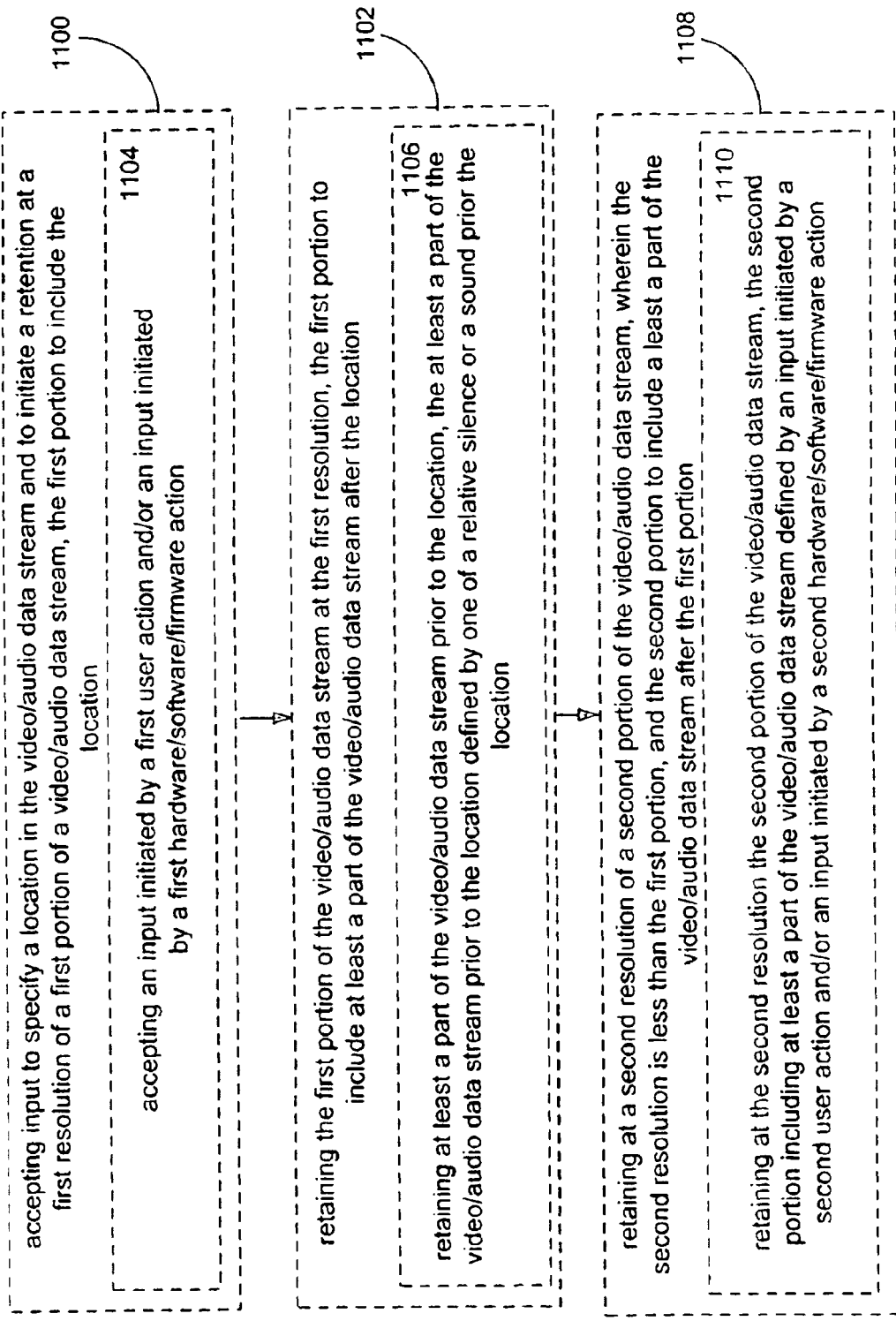
FIG. 11 depicts a high-level logic flowchart of an operational process.

FIG. 11 depicts a high-level logic flowchart of an operational process. The illustrated process may include operations 1100 and/or 1102.

Operation 1100 shows accepting input to specify a location in the video/audio data stream and to initiate a retention at a first resolution of a first portion of a video/audio data stream, the first portion to include the location. Operation 1100 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/or the device 138 and/or the device 140, to specify a point in an video/audio data stream within a voice of particular interest to a user, e.g., user 130, and to start a retention at a relatively high resolution of a portion of the video/audio data stream that includes the specified point. An input, the accepting of which may be included in operation 1100, may be initiated by an action by a user 104/110/118/

130/132/134/136, e.g., pressing a mouse button and/or speaking into a microphone (or by other user actions including but not limited to user actions described elsewhere herein), or the input may be initiated by operation of some hardware/software/firmware, e.g., audio processing software such as the processor 126 and/or the processing logic 128 and/or devices 138/140, or it may be initiated by some combination of human and automated action.

Operation 1102 illustrates retaining the first portion of the video/audio data stream at the first resolution, the first portion to include at least a part of the video/audio data stream after the location. Operation 1102 may include retaining, via the processor 126 and/or the processing logic 128 and/or the digital video camera 102 and/or the digital video camera 106 and/or the sensor 114 and/or the sensor 116 and/or the device 138 and/or device 140, a first portion of the video/audio data stream after the location specified in operation 1100, e.g., a part of a voice of interest at the specified location that comes after that location. Such a retaining may be performed via the processor 126 and/or the processing logic 128 and/or the digital video camera 102 and/or the digital video camera 106 and/or the sensor 114 and/or the sensor 116 and/or the device 138 and/or device 140, using memory resources integral to, associated with, and/or operably coupled to those devices.

Operation 1100—accepting input to specify a location in the video/audio data stream and to initiate a retention at a first resolution of a first portion of a video/audio data stream, the first portion to include the location—may include operation 1104. Operation 1104 depicts accepting an input initiated by a first user action and/or an input initiated by a first hardware/software/firmware action. Operation 1104 may include, for example, accepting input, via a processor 126 and/or a processing logic 128 and/or a digital video camera 102 and/or a digital video camera 106 and/or a sensor 114 and/or a sensor 116 and/or a processor 126 and/or processing logic 128 and/ or the device 138 and/or the device 140, to define a time-wise and/or functionally-related end of a portion of a video/audio data stream, initiated by a human user, e.g., user 130, pressing a button on a digital video camera 106, and/or a system including hardware/software/firmware, e.g., the processor 126 and/or the processing logic 128, providing a system input such as a time out or an input to signal the end of a voice of interest as identified by a voice recognition system.

Operation 1102—retaining the first portion of the video/audio data stream at the first resolution, the first portion to include at least a part of the video/audio data stream after the location—may include operation 1106. Operation 1106 illustrates retaining at least a part of the video/audio data stream prior to the location, the at least a part of the video/audio data stream prior to the location defined by one of a relative silence or a sound prior the location. Operation 1106 may include retaining, via the processor 126 and/or the processing logic 128 and/or the digital video camera 102 and/or the digital video camera 106 and/or the sensor 114 and/or the sensor 116 and/or the device 138 and/or device 140, a first portion of the video/audio data stream before the location specified in operation 1100, e.g., a part of a voice of interest at the specified location that comes before that location. Such a retaining may be performed via the processor 126 and/or the processing logic 128 and/or the digital video camera 102 and/or the digital video camera 106 and/or the sensor 114 and/or the sensor 116 and/or the device 138 and/or device 140, using memory resources integral to, associated with, and/or operably coupled to those devices.

The operational process shown in FIG. 11 may also include operation 1108. Operation 1108 shows retaining at a second resolution of a second portion of the video/audio data stream, wherein the second resolution is less than the first portion, and the second portion to include a least a part of the video/audio data stream after the first portion. Operation 1108 may include, for example, retaining at a relatively low resolution compared to the higher resolution of the first portion, via the processor 126 and/or the processing logic 128 and/or the digital video camera 102 and/or the digital video camera 106 and/or the sensor 114 and/or the sensor 116 and/or the device 138 and/or device 140, a second portion of the video/audio data stream that comes after the first portion, e.g., that part of video/audio data stream that comes after a particular voice of interest that is retained at the higher resolution. Such a retaining may be performed via the processor 126 and/or the processing logic 128 and/or the digital video camera 102 and/or the digital video camera 106 and/or the sensor 114 and/or the sensor 116 and/or the device 138 and/or device 140, using memory resources integral to, associated with, and/or operably coupled to those devices.

Operation 1108—retaining at a second resolution of a second portion of the video/audio data stream, wherein the second resolution is less than the first portion, and the second portion to include a least a part of the video/audio data stream after the first portion—may include operation 1110. Operation 1110 depicts retaining at the second resolution the second portion of the video/audio data stream, the second portion including at least a part of the video/audio data stream defined by an input initiated by a second user action and/or an input initiated by a second hardware/software/firmware action. Operation 1110 may include, for example, retaining at the relatively low resolution, via the processor 126 and/or the processing logic 128 and/or the digital video camera 102 and/or the digital video camera 106 and/or the sensor 114 and/or the sensor 116 and/or the device 138 and/or device 140, the second portion of the video/audio data stream, where the extent of the second portion is defined by input initiated by a human user, e.g., user 130, pressing a button on a digital video camera 106, and/or a system including hardware/software/firmware, e.g., the processor 126 and/or the processing logic 128, providing a system input such as a time out. Such a retaining may be performed via the processor 126 and/or the processing logic 128 and/or the digital video camera 102 and/or the digital video camera 106 and/or the sensor 114 and/or the sensor 116 and/or the device 138 and/or device 140, using memory resources integral to, associated with, and/or operably coupled to those devices.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method related to data management, the method comprising:
    accepting input for a designation of a reference designator and a beginning demarcation designator and/or an ending demarcation designator in a video/audio data stream, wherein the beginning demarcation designator and/or the ending demarcation designator are defined relative to the reference designator;
    accepting input from a first device and retaining in a hardware device at a first resolution of a first portion of the video/audio data stream, the first portion beginning substantially at the beginning demarcation designator and ending substantially at the ending demarcation designator; and
    accepting input and recording from a second device for a retention at a second resolution of a second portion of the video/audio data stream, wherein the second resolution is less than the first resolution when a condition is met, wherein the second resolution is a function of a distance in the video/audio data stream between the first portion to be retained at the first resolution and the second portion of the video/audio data stream and includes degrading blocks of the second portion of the video/data stream according to their time distance from the first portion of the video/data stream, and wherein the retention of the second portion of the video/audio data stream at the second resolution is performed when a condition responsive to data received from the second device is met.

2. The method of claim 1, wherein the accepting input for a designation of a reference designator and a beginning demarcation designator and/or an ending demarcation designator in a video/audio data stream, wherein the beginning demarcation designator and/or the ending demarcation designator are defined relative to the reference designator further comprises:
    accepting input for a confirmation of an aspect of the designation of the reference designator and/or the beginning demarcation designator and/or the ending demarcation designator in the video/audio data stream.

3. The method of claim 1, wherein the accepting input for a designation of a reference designator and a beginning demarcation designator and/or an ending demarcation designator in a video/audio data stream, wherein the beginning demarcation designator and/or the ending demarcation designator are defined relative to the reference designator further comprises:
    accepting a sonic input.

4. The method of claim 1, wherein the accepting input for a designation of a reference designator and a beginning demarcation designator and/or an ending demarcation designator in a video/audio data stream, wherein the beginning demarcation designator and/or the ending demarcation designator are defined relative to the reference designator further comprises:
    accepting a visual input.

5. The method of claim 4, wherein the accepting a visual input further comprises:
    accepting the visual input, wherein the visual input includes data representing stored visual information.

6. The method of claim 1, wherein the accepting input for a designation of a reference designator and a beginning demarcation designator and/or an ending demarcation designator in a video/audio data stream, wherein the beginning demarcation designator and/or the ending demarcation designator are defined relative to the reference designator further comprises:

accepting input for a designation of a relative motion/silence prior to the reference designator as the beginning demarcation designator in the video/audio data stream.

7. The method of claim 1, wherein the accepting input for a designation of a reference designator and a beginning demarcation designator and/or an ending demarcation designator in a video/audio data stream, wherein the beginning demarcation designator and/or the ending demarcation designator are defined relative to the reference designator further comprises:

accepting input of a designation of an ending designator of a latest image/sound prior to the reference designator as the beginning demarcation designator in the video/audio data stream.

8. The method of claim 1, wherein the accepting input for a designation of a reference designator and a beginning demarcation designator and/or an ending demarcation designator in a video/audio data stream, wherein the beginning demarcation designator and/or the ending demarcation designator are defined relative to the reference designator further comprises:

accepting input of a designation of a relative motion/silence after an image/sound at the reference designator as the ending demarcation designator in the video/audio data stream.

9. The method of claim 1, wherein the accepting input for a retention at a first resolution of a first portion of the video/audio data stream, the first portion beginning substantially at the beginning demarcation designator and ending substantially at the ending demarcation designator, further comprises:

accepting input for a designation of a first portion of a live and/or a substantially live video/audio data stream for the retention at the first resolution.

10. The method of claim 1, wherein the accepting input for a retention at a first resolution of a first portion of the video/audio data stream, the first portion beginning substantially at the beginning demarcation designator and ending substantially at the ending demarcation designator, further comprises:

accepting input for a designation of a first portion of a retained video/audio data stream for the retention at the first resolution.

11. The method of claim 1, wherein the accepting input for a retention at a first resolution of a first portion of the video/audio data stream, the first portion beginning substantially at the beginning demarcation designator and ending substantially at the ending demarcation designator further comprises:

accepting an input for a confirmation of an aspect of the input for the retention at the first resolution of the first portion of the video/audio data stream.

12. The method of claim 1, wherein the accepting input for a retention at a first resolution of a first portion of the video/audio data stream, the first portion beginning substantially at the beginning demarcation designator and ending substantially at the ending demarcation designator further comprises:

accepting an input for a designation of a first resolution value.

13. The method of claim 1, wherein the accepting input for a retention at a first resolution of a first portion of the video/audio data stream, the first portion beginning substantially at the beginning demarcation designator and ending substantially at the ending demarcation designator further comprises:

accepting an input for a designation of a first frequency spectrum characteristic.

14. The method of claim 1, wherein the accepting input for a retention at a second resolution of a second portion of the video/audio data stream, wherein the second resolution is less than the first resolution, when a condition is met, further comprises:

accepting an input for a confirmation of an aspect of the input for the retention at the second resolution of the second portion of the video/audio data stream.

15. The method of claim 1, wherein the accepting input for a retention at a second resolution of a second portion of the video/audio data stream, wherein the second resolution is less than the first resolution, when a condition is met, further comprises:

accepting input for the retention at the second resolution of the second portion of the video/audio data stream, wherein the second resolution is determined as a function of a temporal distance in the video/audio data stream between at least a part of the first portion of the video/audio data stream and at least a part of the second portion of the video/audio data stream.

16. The method of claim 1, wherein the accepting input for a retention at a second resolution of a second portion of the video/audio data stream, wherein the second resolution is less than the first resolution, when a condition is met, further comprises:

accepting input for the retention at the second resolution of the second portion of the video/audio data stream, wherein the retention at the second resolution is to be performed if a preselected time has elapsed after a specified previous retention of the second portion of the video/audio data stream.

17. The method of claim 1, wherein the accepting input for a retention at a second resolution of a second portion of the video/audio data stream, wherein the second resolution is less than the first resolution, when a condition is met, further comprises:

accepting input for the retention at the second resolution of the second portion of the video/audio data stream, wherein the retention at the second resolution is to be performed when a time value is framed by a preselected time window.

18. The method of claim 1, wherein the accepting input for a retention at a second resolution of a second portion of the video/audio data stream, wherein the second resolution is less than the first resolution, when a condition is met, further comprises:

accepting input for the retention at the second resolution of the second portion of the video/audio data stream, wherein the retention of the second portion of the video/audio data stream at the second resolution is to be performed if a condition is met, wherein the condition is related to one or more of a set of events and/or conditions excluding a specified previous retention of the second portion of the video/audio data stream.

19. The method of claim 1, wherein the accepting input for a retention at a second resolution of a second portion of the video/audio data stream, wherein the second resolution is less than the first resolution, when a condition is met, further comprises:

accepting an input for a designation of a second resolution value.

20. The method of claim 1, wherein the accepting input for a retention at a second resolution of a second portion of the video/audio data stream, wherein the second resolution is less than the first resolution, when a condition is met, further comprises:
  accepting an input for a designation of a second frequency spectrum characteristic.

21. The method of claim 1, further comprising:
  accepting input for a retention at a third resolution of the second portion of the video/audio data stream when a further condition is met, wherein the third resolution is less than the second resolution.

22. The method of claim 1, further comprising:
  retaining at the first resolution the first portion of the video/audio data stream, the first portion beginning substantially at the beginning demarcation designator and ending substantially at the ending demarcation designator.

23. The method of claim 1, further comprising:
  retaining at the second resolution the second portion of the video/audio data stream when the condition is met.

24. The method of claim 23, wherein the retaining at the second resolution the second portion of the video/audio data stream when the condition is met further comprises:
  retaining the second portion of the video/audio data stream using a compression algorithm.

25. The method of claim 1, wherein the retention of the second portion of the video/audio data stream at the second resolution is to be performed when a condition responsive to data received from a device other than a device used for a specified previous retention of the second portion of the video/audio data stream is met.

26. The method of claim 1, wherein the second portion of the video/audio data stream is transmitted sequentially relative to the first portion of the video/audio data stream.

27. The method of claim 1, wherein the second resolution is determined by a preselected time window between a current time and a time of the video/audio data stream.

28. The method of claim 1, wherein accepting input from the second device includes accepting input for a retention, at a third resolution, the second portion of the video/audio data stream when a further condition is met, wherein the third resolution is less than the second resolution.

29. The method of claim 1, wherein the second resolution is a degradation of the first resolution, and wherein the degradation is correlated with a timeframe between two or more of detection, recording, transmission and storage.

30. The method of claim 29, wherein the degradation is influenced by an input parameter, wherein the degradation input parameter is one from the group including a resolution value, a frequency range value, and a frequency distribution value.

31. The method of claim 1, wherein accepting input is initiated by a combination of human action and automated action.

32. The method of claim 1, wherein the retention of the second portion of the video/audio data stream includes redaction of one or more portions of the video/audio data stream of the first portion of the video/audio data stream.

33. The method of claim 32, wherein the redaction includes removing of high and low frequencies of an audio portion of the first portion of the video/audio data stream.

34. A method related to data management, the method comprising:
  accepting input to specify a location in a video/audio data stream and to initiate a retention at a first resolution of a first portion of the video/audio data stream, the first portion to include the location in the video/audio data stream;
  retaining the first portion of the video/audio data stream at the first resolution in a hardware device, the first portion to include at least a part of the video/audio data stream after the location; and
  accepting input and recording for retention in a hardware device from a second device for a retention at a second resolution of a second portion of the video/audio data stream wherein the second resolution is less than the first resolution when a condition is met, wherein the retention of the second portion of the video/audio data stream at the second resolution is performed when a condition responsive to data received from a second device is met, wherein the second resolution is a function of a distance in the video/audio data stream between the first portion to be retained at the first resolution and the second portion of the video/audio data stream and includes degrading blocks of the second portion of the video/data stream according to their time distance from the first portion of the video/data stream.

35. The method of claim 34, wherein the accepting input to specify a location in a video/audio data stream and to initiate a retention at a first resolution of a first portion of the video/audio data stream, the first portion to include the location further comprises:
  accepting an input initiated by a first user action and/or an input initiated by a first hardware/software/firmware action.

36. The method of claim 34, wherein the retaining the first portion of the video/audio data stream at the first resolution, the first portion to include at least a part of the video/audio data stream after the location further comprises:
  retaining at least a part of the video/audio data stream prior to the location, the at least a part of the video/audio data stream prior to the location defined by one of a relative silence or a sound prior the location.

37. The method of claim 31, wherein the second resolution is less than the first portion, and the second portion to include a least a part of the video/audio data stream after the first portion.

38. The method of claim 37, wherein the recording for a retention in a hardware device from a second device for a retention at a second resolution of a second portion of the video/audio data stream further comprises:
  retaining at the second resolution the second portion of the video/audio data stream, the second portion including at least a part of the video/audio data stream defined by an input initiated by a second user action and/or an input initiated by a second hardware/software/firmware action.

39. A system related to data management, the system comprising:
  means for accepting input for a designation of a reference designator and a beginning demarcation designator and/or an ending demarcation designator in a video/audio data stream, wherein the beginning demarcation designator and/or the ending demarcation designator are defined relative to the reference designator;
  means for accepting input for a retention at a first resolution of a first portion of the video/audio data stream, the first portion beginning substantially at the beginning demarcation designator and ending substantially at the ending demarcation designator; and
  means for accepting input and recording for retention in a hardware device from a second device for a retention at a second resolution of a second portion of the video/audio data stream wherein the second resolution is less than the first resolution when a condition is met, wherein the retention of the second portion of the video/audio data stream at the second resolution is to be performed when a condition responsive to data received from a second device is met, wherein the second resolution is a function of a distance in the video/audio data stream between the first portion to be retained at the first resolution and the second portion of the video/audio data stream and includes degrading blocks of the second portion of the video/data stream according to their time distance from the first portion of the video/data stream.

40. A system related to data management, the system comprising:
   means for accepting input to specify a location in a video/audio data stream and to initiate a retention at a first resolution of a first portion of the video/audio data stream, the first portion to include the location; and
   means for retaining the first portion of the video/audio data stream at the first resolution, the first portion to include at least a part of the video/audio data stream after the location; and
   means for accepting input and recording for retention in a hardware device from a second device for a retention at a second resolution of a second portion of the video/audio data stream wherein the second resolution is less than the first resolution when a condition is met, wherein the retention of the second portion of the video/audio data stream at the second resolution is to be performed when a condition responsive to data received from a second device is met, and wherein the second resolution is a function of a distance in the video/audio data stream between the first portion to be retained at the first resolution and the second portion of the video/audio data stream and includes degrading blocks of the second portion of the video/data stream according to their time distance from the first portion of the video/data stream.

* * * * *

UNITED STATES PATENT AND TRADEMARK OFFICE
CERTIFICATE OF CORRECTION

PATENT NO.        : 8,233,042 B2                                    Page 1 of 1
APPLICATION NO.   : 11/441785
DATED             : July 31, 2012
INVENTOR(S)       : Edward K. Y. Jung et al.

It is certified that error appears in the above-identified patent and that said Letters Patent is hereby corrected as shown below:

Column 40, line 36, claim 37: "The method of claim 31," should read --The method of claim 34,--

Signed and Sealed this
Ninth Day of April, 2013

Teresa Stanek Rea
*Acting Director of the United States Patent and Trademark Office*